US012613582B1

(12) United States Patent
    Kojima

(10) Patent No.: US 12,613,582 B1
(45) Date of Patent: Apr. 28, 2026

(54) CONTROLLER AND VIBRATION FEEDBACK DEVICE

(71) Applicant: Mamoru Kojima, Tokyo (JP)

(72) Inventor: Mamoru Kojima, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/003,187

(22) Filed: Dec. 27, 2024

(30) Foreign Application Priority Data

Jan. 10, 2024 (JP) ................................ 2024-001788
Jan. 10, 2024 (JP) ................................ 2024-001791
Jan. 10, 2024 (JP) ................................ 2024-001792

(51) Int. Cl.
    *G06F 3/01* (2006.01)
    *A63F 13/285* (2014.01)
(52) U.S. Cl.
    CPC ............ *G06F 3/016* (2013.01); *A63F 13/285* (2014.09); *A63F 2300/1037* (2013.01)
(58) Field of Classification Search
    None
    See application file for complete search history.

(56) References Cited

U.S. PATENT DOCUMENTS

2010/0309141 A1   12/2010   Cruz-Hernandez et al.
2016/0155305 A1*   6/2016   Barsilai .................... G08B 6/00
                                                340/407.1

2018/0081477 A1*   3/2018   Picciotto ................. G06F 3/044
2021/0064143 A1*   3/2021   Stern ................... G06F 3/04886
2021/0186794 A1*   6/2021   Seim .................... A61H 1/0274
2023/0400925 A1   12/2023   Takahashi et al.

FOREIGN PATENT DOCUMENTS

JP        2010-287232     12/2010
JP        2022-072888     5/2022
KR    10-2013-0024420     3/2013

OTHER PUBLICATIONS

Extended European search report mailed on Jun. 4, 2025 with respect to the corresponding European patent application No. 25150793.5.

* cited by examiner

*Primary Examiner* — Carl Adams
(74) *Attorney, Agent, or Firm* — IPUSA, PLLC

(57) ABSTRACT

A controller includes a press detection circuit that suppresses an output of a first press detection signal while receiving a first drive period signal indicating a drive period of an actuator, and includes a drive signal generation circuit that generates a first drive signal to drive the actuator based on a drive startup signal that is externally received in response to the first press detection signal being externally output, generates a second drive signal to drive the actuator based on the first detection signal that is output from a sensor in response to vibration of an operation device caused by the first drive signal, and outputs the first drive period signal during a period in which the actuator is driven by the first drive signal and the second drive signal.

6 Claims, 20 Drawing Sheets

CONTROLLER AND VIBRATION FEEDBACK DEVICE

CROSS-REFERENCE TO RELATED APPLICATIONS

This application claims priority under 35 U.S.C. § 119 to Japanese Patent Application Nos. 2024-001788, filed Jan. 10, 2024, 2024-001791, filed Jan. 10, 2024, and 2024-001792, filed Jan. 10, 2024, the contents of which are incorporated herein by reference.

BACKGROUND

1. Technical Field

The present disclosure relates to a controller and a vibration feedback device.

2. Description of the Related Art

For example, there are known haptic interfaces that provide haptic sensations to users through actuator-driven vibrations when the users contact operation devices such as touch panels. Such a haptic interface provides a user with a sense of mechanical clicking sensation by generating a drive pulse signal to be output to an actuator based on the contact with an operation device; applying vibration to the operation device; and then performing feedback control to generate a subsequent drive pulse signal that maintains or attenuates the vibration.

RELATED-ART DOCUMENT

Patent Document

Patent Document 1: Japanese Laid-Open Patent Application Publication No. 2010-287232

SUMMARY

A controller for controlling an actuator that applies vibration to an operation device based on operation of the operation device is provided. The controller includes:
a press detection circuit configured to
output a first press detection signal when pressing of the operation device is detected based on a first detection signal that is output from a sensor that detects displacement of the operation device caused by the pressing, a press-and-hold operation, or vibration of the operation device, and
suppress an output of the first press detection signal while receiving a first drive period signal indicating a drive period of the actuator; and
a drive signal generation circuit configured to
generate a first drive signal to drive the actuator based on a drive startup signal that is externally received in response to externally outputting the first press detection signal,
generate a second drive signal to drive the actuator based on the first detection signal that is output from the sensor in response to the vibration of the operation device caused by the first drive signal, and
output the first drive period signal during a period in which the actuator is driven by the first drive signal and the second drive signal.

DETAILED DESCRIPTION

In the related art, a controller mounted on a haptic interface has, for example, an analog front end that converts output signals from a sensor, which detects contact and vibration of an operation device, into digital signals; a filter that removes noise from the digital signals; and a drive signal generator that generates drive pulse signals based on the digital signals. When a system has a low-power mode, for example, the controller has a regulator that generates a power supply voltage; a clock unit that generates a clock signal; and a low-power control unit that controls the regulator and the clock unit such that the regulator stops generating the power supply voltage and the clock unit stops generating the clock signal in the low-power mode.

Suppose that the haptic interface has the low-power mode and a microcomputer controls the low-power mode of the haptic interface. In this case, when the low-power mode is exited, the microcomputer needs to activate components in the controller in a predetermined order to prevent malfunction of the haptic interface. In addition, if one or more parameters stored in a storage unit according to a natural frequency of an actuator are lost due to transition to the low-power mode, the microcomputer needs to reset the parameters in the storage unit when exiting the low-power mode. When the microcomputer performs startup or setting of the controller upon exiting the low-power mode of the haptic interface, there is a problem that a time period required to exit the low-power mode becomes longer.

An object of a disclosed technique is to reduce the time period required to exit the low-power mode in a controller mounted on a vibration feedback device that applies vibration to an operation device based on detection of contact with an operation device.

Embodiments will be described below with reference to the drawings. In the following description, the same symbols as signal names may be used for signal lines through which signals are transmitted, signal terminals, signal nodes, and signal values. The same symbols as voltage names may be used for voltage lines through which voltages are supplied, voltage terminals, and voltage nodes. In each drawing, the same components are denoted by the same numerals, and duplicate description may be omitted.

(Example of Vibration Feedback Device Including Controller)

Figure 1:
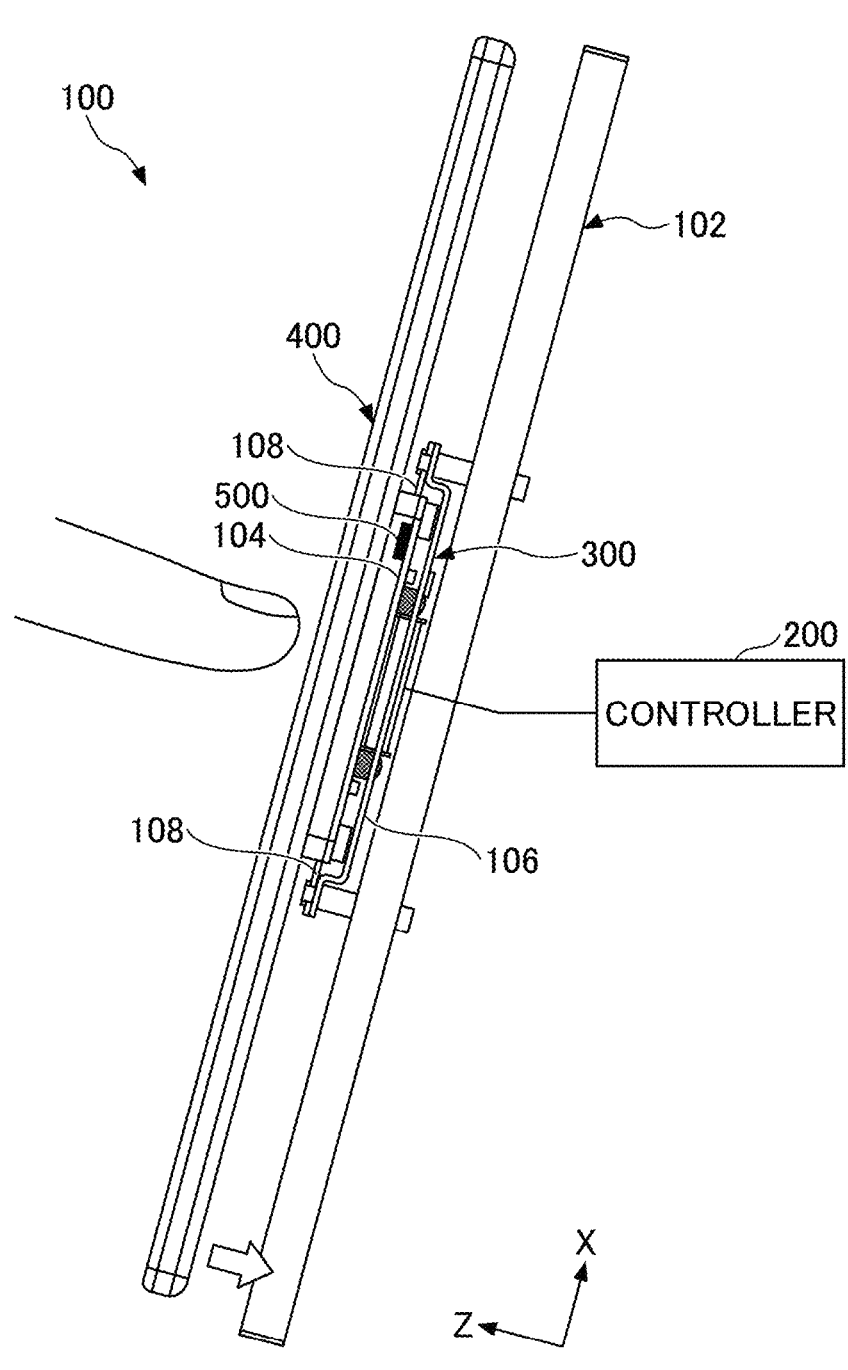
FIG. 1 is a side view showing an example of a vibration feedback device including a controller according to one embodiment.

FIG. 1 is a side view showing an example of a vibration feedback device 100 including a controller 200 according to one embodiment. In FIG. 1, a portion of components of the vibration feedback device 100 is shown transparently. The vibration feedback device 100 shown in FIG. 1 includes the controller 200, an electromagnetic actuator 300, a touch panel 400, and a distortion detection sensor 500. For example, the controller 200 is manufactured as a semiconductor chip, and is mounted on a substrate (not shown) mounted on the vibration feedback device 100. The vibration feedback device 100 may operate by power that is supplied from a battery.

The electromagnetic actuator 300 is disposed between the touch panel 400 and a base 102 that faces the touch panel 400, and is fixed to the base 102. The touch panel 400 is supported by a movable plate 104 that is movably arranged on the electromagnetic actuator 300 in a Z direction. The movable plate 104 is connected to a plate-like fixed body 106 that is mounted on the base 102, via a plate-like elastic member 108. For example, the distortion detection sensor 500 is mounted on the movable plate 104 and detects displacement of the touch panel 400 that moves with the movable plate 104 due to pressing or vibration of the touch panel 400.

The plate-like elastic member 108 deforms in accordance with a force pulling the movable plate 104 toward the electromagnetic actuator 300, due to a magnetic force that is generated by the driving of the electromagnetic actuator 300, and then the plate-like elastic member 108 moves the movable plate 104 in a –Z direction. The touch panel 400 moves in a –Z direction as the movable plate 104 moves. The plate-like elastic member 108 returns to its original shape by stopping the driving of the electromagnetic actuator 300. When the plate-like elastic member 108 returns to its original shape, the movable plate 104 and the touch panel 400 return to their original positions.

Then, by repeating the driving and stopping of the electromagnetic actuator 300 through the controller 200, the touch panel 400 can vibrate. Further, by varying the driving force and a drive period of the electromagnetic actuator 300, an amplitude and period of vibration can be freely adjusted.

The touch panel 400 may have a function of detecting a contact position of a user's finger or the like. For example, the touch panel 400 may be capacitive, resistive, or optical, and is an example of an operation device operated by users. The touch panel 400 may have a screen of a liquid crystal display, organic EL, electronic paper, a plasma display, or the like.

For example, a system such as an electronic device including the vibration feedback device 100 may include an image display device used in a car navigation system, a smartphone, a notebook computer, a tablet computer, a television set, or the like; a game machine with a touch panel; or a game controller with a touch panel. The touch panel 400 may be mounted overlaid on a display screen in each of the above systems, or may be mounted as a touch pad.

The vibration feedback device 100 applies vibration to the touch panel 400 in response to the user's contact operation on the touch panel 400, thereby providing a touch operation feeling (hereinafter also referred to as a haptic sensation) to a user that operates the touch panel 400. The controller 200 sets the amplitude of the vibration applied to the touch panel 400 in response to a user's press operation on the touch panel 400, and outputs a drive signal to the electromagnetic actuator 300. The controller 200 sets the amplitude of the vibration applied to the touch panel 400 in response to the user's press operation on the touch panel 400, a pressing force, and a press-and-hold operation (release from pressing), and outputs the drive signal to the electromagnetic actuator 300.

When the controller 200 can detect a contact position of the user's finger or the like on the touch panel 400, the controller 200 may change characteristics of the vibration applied to the touch panel 400, in accordance with the contact position. The contact position may be detected by the controller 200, or may be detected by a microcomputer mounted in a system such as an electronic device including the vibration feedback device 100.

(Block Diagram of Vibration Feedback Device)

Figure 2:
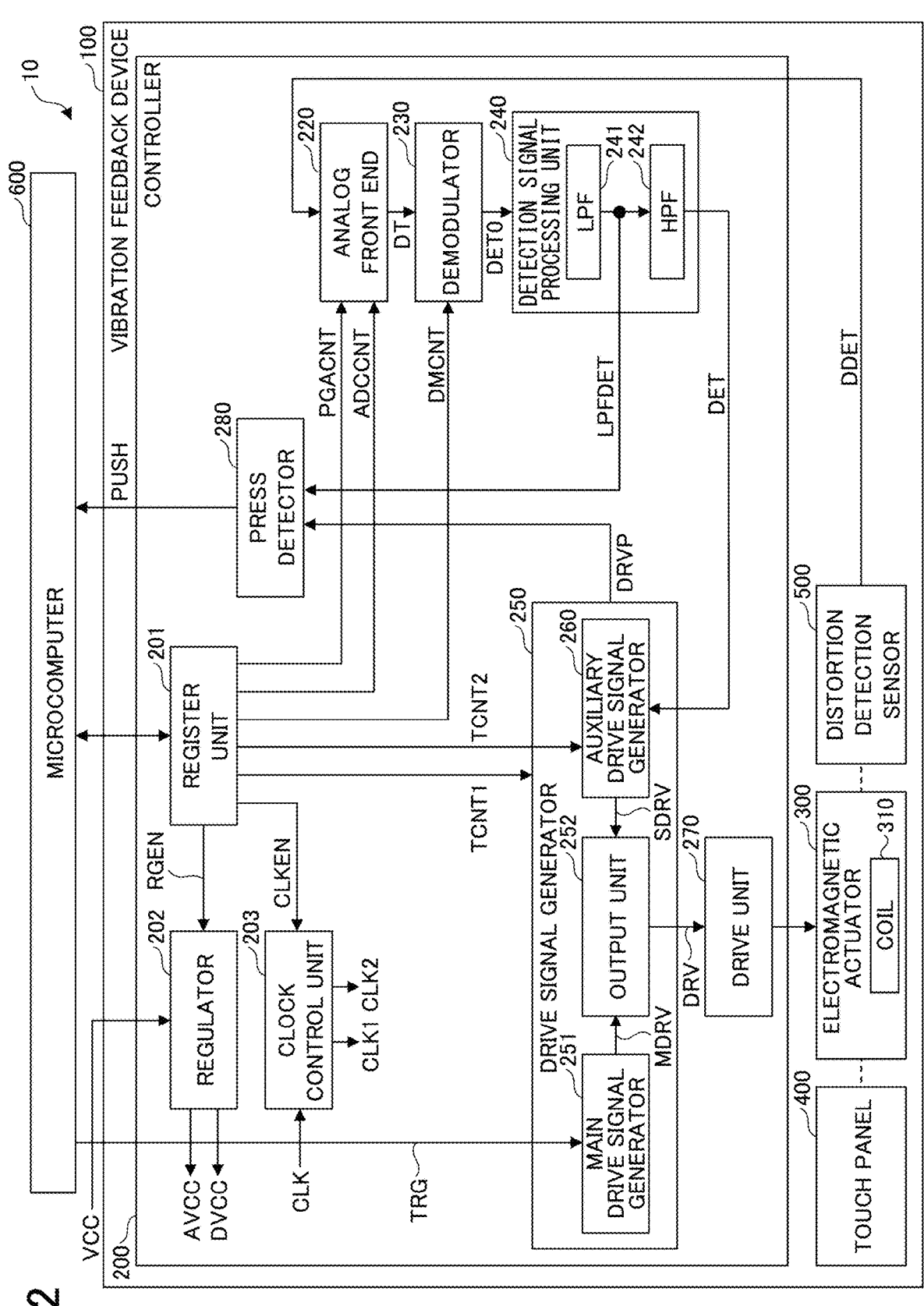
FIG. 2 is a block diagram showing an example of the vibration feedback device of FIG. 1.

FIG. 2 is a block diagram showing an example of the vibration feedback device 100 shown in FIG. 1. FIG. 2 shows the configuration of a system 10 on which the vibration feedback device 100 is mounted. The system 10 includes the vibration feedback device 100 and a microcomputer 600. For example, the microcomputer 600 may be mounted on a system board provided in the system 10. The vibration feedback device 100 shown in FIG. 2 has been proposed by the inventor of this application and is not publicly known. A problem of the vibration feedback device 100 will be described with reference to FIG. 3.

The vibration feedback device 100 includes the controller 200, an electromagnetic actuator 300 including a coil 310, a touch panel 400, and a distortion detection sensor 500. The vibration feedback device 100 detects contact of the user's finger or the like on the touch panel 400, and has a steady mode for applying vibration to the touch panel 400, and has a standby mode for reducing power consumption. The standby mode is an example of a low power mode. The distortion detection sensor 500 that is supported on the movable plate 104 of FIG. 1 together with the touch panel 400 detects displacement of the touch panel 400 in response to pressing of the touch panel 400 or vibration by the electromagnetic actuator 300.

The controller 200 has a register unit 201, a regulator 202, a clock control unit 203, an analog front end 220, a demodulator 230, a detection signal processing unit 240, a drive signal generator 250, a drive unit 270, and a press detector 280. The detection signal processing unit 240 has a low-pass filter (LPF) 241 and a high-pass filter (HPF) 242. The drive signal generator 250 has a main drive signal generator 251, an auxiliary drive signal generator 260, and an output unit 252.

The register unit 201 has a plurality of registers that are read from and written to using the microcomputer 600. The register unit 201 outputs any one among a regulation enable signal RGEN, a clock enable signal CLKEN, timing signals TCNT1 and TCNT2, and control signals PGACNT, ADCCNT, and DMCCNT, based on information set by the microcomputer 600. The register unit 201 is supplied by power not only in the steady mode but also in the standby mode, and thus the register unit 201 can hold various data, and can read and write various data in the standby mode.

Signals output from the register unit 201 shown in FIG. 2 mainly include signals that are used for transition to and from the standby mode. The regulation enable signal RGEN, the clock enable signal CLKEN, the timing signals TCNT1 and TCNT2, and the control signals PGACNT, ADCCNT, and DMCCNT are examples of startup control signals. Although not particularly limited, the microcomputer 600 can access the register unit 201 via, for example, an inter-integrated circuit (I2C) interface. The regulator 202 has a function of generating a power supply voltage AVCC used in the analog circuit block in the controller 200; and a power supply voltage DVCC used in the digital circuit block in the controller 200, where the function is implemented using a power supply voltage VCC that is received from the outside of the vibration feedback device 100. For example, the power supply voltage AVCC is lower than the power supply voltage VCC, and the power supply voltage DVCC is equal to the power supply voltage VCC. The regulator 202 generates the power supply voltages AVCC and DVCC during assertion of the regulation enable signal RGEN, and stops the generation of the power supply voltages AVCC and DVCC during negation of the regulation enable signal RGEN.

When the power supply voltage DVCC is supplied to the register unit 201, data held in the register unit 201 completely disappears when the generation of the power supply voltage DVCC stops due to the negation of the regulation enable signal RGEN. In order to suppress the loss of data, the power supply voltage that is generated during the negation of the regulation enable signal RGEN is supplied to the register unit 201. Also, in order to make the register unit 201 accessible during the standby mode, a clock signal CLK that is generated even during the standby mode, or a frequency-divided clock signal obtained by frequency-dividing the clock signal CLK, is supplied to the register unit 201. In this arrangement, a logic held in the register unit 201 during the standby mode can be maintained without losing the logic, and the logic held in the register unit 201 can be rewritten when the vibration feedback device 100 returns from the standby mode to the steady mode.

With use of the clock signal CLK generated in the analog circuit block in the controller 200, the clock control unit 203 generates the clock signals CLK1 and CLK2 that are used in the digital circuit block during the steady mode, and then the clock control unit 203 stops the generation of the clock signals CLK1 and CLK2 during the standby mode. The clock signal CLK is generated based on the power supply voltage AVCC, and is generated during the assertion of the regulation enable signal RGEN. The clock control unit 203 is an example of a clock generator. The clock signal CLK is an example of a first clock signal, and the clock signals CLK1 and CLK2 are examples of a second clock signal.

The clock control unit 203 generates the clock signals CLK1 and CLK2 during the assertion of the clock enable signal CLKEN, and stops the generation of the clock signals CLK1 and CLK2 during the negation of the clock enable signal CLKEN. For example, the clock signal CLK1 has the same frequency as the clock signal CLK. For example, the clock signal CLK2 is generated by frequency-dividing the clock signal CLK, and has a frequency that is equal to half that of the clock signal CLK.

The analog front end 220 includes, for example, an offset canceller, a programmable gain amplifier, and a delta-sigma ADC (Analog-to-Digital Converter) that are not shown. The offset canceller cancels an offset of a detection signal DDET (analog signal) indicating an amount of distortion detected by the distortion detection sensor 500, and outputs a result to the programmable gain amplifier.

The programmable gain amplifier operates during the assertion of the control signal PGACNT, and amplifies the detection signal DDET whose offset has been canceled. The programmable gain amplifier stops operating during the negation of the control signal PGACNT.

The delta-sigma ADC operates during assertion of a control signal ADCCNT, generates a serial data signal DT in response to a change in the voltage of the amplified detection signal DDET, and outputs the generated serial data signal DT to the demodulator 230. The delta-sigma ADC stops operating during negation of the control signal ADCCNT.

The demodulator 230 operates during the assertion of the control signal DMCNT, sequentially demodulates the serial data signal DT that is received from the delta-sigma ADC while shifting bit positions, and generates a plurality of detection signals DETO indicating respective amounts of distortion of the touch panel 400. The demodulator 230 sequentially outputs the generated detection signals DETO to the detection signal processing unit 240. The demodulator 230 stops operating during the negation of the control signal DMCNT. The analog front end 220 and the demodulator 230 are examples of converters that generate the detection signals DETO from the detection signal DDET.

The low-pass filter 241 of the detection signal processing unit 240 performs noise removal processing of the detection signal DETO received from the demodulator 230, and outputs a result as a detection signal LPFDET to the high-pass filter 242 and the press detector 280. The high-pass filter 242 performs offset removal processing of the detection signal LPFDET from which the noise received from the low-pass filter 241 has been removed, and outputs a result as a detection signal DET to the auxiliary drive signal generator 260. The detection signal DETO is an example of a first digital signal, and the detection signals LPFDET and DET are examples of a second digital signal.

The main drive signal generator 251 of the drive signal generator 250 generates a main drive signal MDRV in response to a trigger signal TRG that is received from the microcomputer 600, and outputs the generated main drive signal MDRV to the output unit 252. Although not particularly limited, for example, the main drive signal MDRV may be a square wave. The main drive signal MDRV is an example of a first drive signal.

The auxiliary drive signal generator 260 determines the amplitude of the auxiliary drive signal SDRV based on a peak timing and a bottom timing of the waveform of the detection signal DET from the detection signal processing unit 240, or on a set of the peak timing, the bottom timing, and a zero cross timing. The auxiliary drive signal generator 260 generates the auxiliary drive signal SDRV having the determined amplitude, and outputs the generated auxiliary drive signal SDRV to the output unit 252. Although not particularly limited, for example, the auxiliary drive signal SDRV may be a sine wave. The auxiliary drive signal SDRV is an example of a second drive signal.

The output unit 252 outputs either the main drive signal MDRV from the main drive signal generator 251 or the auxiliary drive signal SDRV from the auxiliary drive signal generator 260 to the drive unit 270 as a drive signal DRV. The drive unit 270 drives the electromagnetic actuator 300 in response to the drive signal DRV from the drive signal generator 250. While the electromagnetic actuator 300 is driven, the touch panel 400 moves toward the electromagnetic actuator 300 together with the distortion detection sensor 500, in response to the magnetic force that is generated using the coil 310 mounted on the electromagnetic actuator 300.

The press detector 280 receives the detection signal LPFDET from the detection signal processor 240 and a drive period signal DRVP from the drive signal generator 250. The drive signal generator 250 asserts the drive period signal DRVP during a period for generating the drive signal DRV according to the detection signal DET, and negates the drive period signal DRVP when the detection signal DET becomes smaller than a predetermined amplitude. For example, the amplitude of the detection signal DET for determining the negation of the drive signal DRVP may be set in the register unit 201.

The press detector 280 stops detecting the press operation of the touch panel 400 when the drive period signal DRVP is asserted. The press detector 280 detects the press operation of the touch panel 400 based on the detection signal LPFDET from the detection signal processing unit 240, when the drive period signal DRVP is negated.

When the press detector 280 detects the press operation of the touch panel 400, the press detector 280 outputs a press detection signal PUSH to the microcomputer 600. The microcomputer 600 outputs the trigger signal TRG to the vibration feedback device 100 in response to the press detection signal PUSH. The press detection signal PUSH may be communicated to the microcomputer 600 as an interrupt signal.

The press operation is detected when the distortion (pressing force) of the touch panel 400 detected by the distortion detection sensor 500 is equal to or greater than a predetermined value when the touch panel 400 is pressed. By stopping the detection of the press operation through the press detector 280 during the assertion of the drive period signal DRVP, it is possible to suppress the output of the press detection signal PUSH due to vibration of the touch panel 400 when the touch panel 400 is not pressed, such as the driving of the electromagnetic actuator 300 through the drive signal generator 250.

As described above, the vibration feedback device 100 generates the main drive signal MDRV based on the trigger signal TRG output from the microcomputer 600 in response to detecting the press operation of the touch panel 400, and drives the electromagnetic actuator 300. Subsequently, the vibration feedback device 100 detects the amount of distortion (vibration) of the touch panel 400 according to the main drive signal MDRV, by using the distortion detection sensor 500. Then, the vibration feedback device 100 generates the auxiliary drive signal SDRV in response to the detection signal DET indicating the detected amount of distortion, and drives the electromagnetic actuator 300. The auxiliary drive signal SDRV has an amplitude corresponding to the amount of distortion indicated by the detection signal DET, and the auxiliary drive signal SDRV may be generated a plurality of times. In this arrangement, a user that operates the touch panel 400 can be provided with a haptic sensation for each application of the touch panel 400.

(Operational Timing of Controller Shown in FIG. 2)

Figure 3:
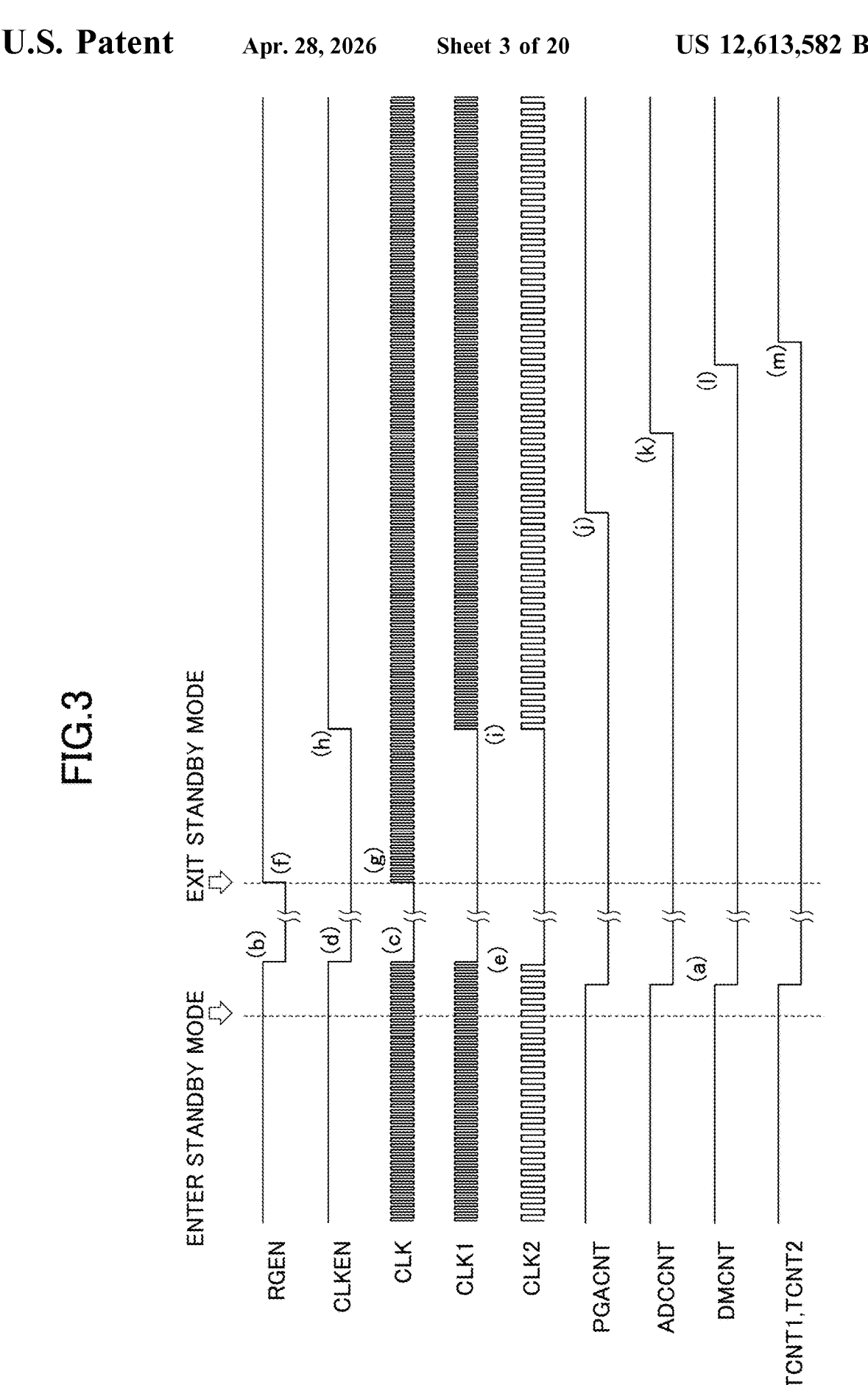
FIG. 3 is a timing diagram showing an example of using a microcomputer to control the transition to and from standby mode of the controller of FIG. 2.

FIG. 3 is a timing diagram showing an example of using the microcomputer 600 to control the transition to and from the standby mode of the controller 200 of FIG. 2. When the microcomputer 600 causes the controller 200 to enter the standby mode, or when the microcomputer 600 causes the controller 200 to exit the standby mode, the microcomputer 600 accesses the register unit 201, and then the microcomputer 600 negates or asserts a predetermined control signal, or outputs a predetermined timing signal.

When causing the controller 200 to enter the standby mode, the control signals PGACNT, ADCCNT, and DMCNT, and timing signals TCNT1 and TCNT2 are each negated by setting information in the register unit 201 through the microcomputer 600 (FIG. 3(a)). The programmable gain amplifier and the delta-sigma ADC of the analog front end 220 stop operating by negating the control signals PGACNT and ADCCNT, and the demodulator 230 stops operating by negating the control signal DMCNT. The drive signal generator 250 stops operating by negating the timing signals TCNT1 and TCNT2.

Next, by setting information in the register unit 201, the microcomputer 600 negates the regulation enable signal RGEN to cause the regulator 202 to stop the generation of the power supply voltages AVCC and DVCC (FIG. 3(b)). Generation of the clock signal CLK is stopped when the generation of power supply voltage AVCC stops (FIG. 3(c)). As described in FIG. 2, the register unit 201 is supplied with both the power supply voltage as generated even during negation of the regulation enable signal RGEN and clock signal, and thus the register unit 201 is accessible during the standby mode.

The microcomputer 600 negates the clock enable signal CLKEN by setting information in the register unit 201 (FIG. 3(d)). The negation of the clock enable signal CLKEN stops the clock control unit 203 from generating the clock signals CLK1 and CLK2 (FIG. 3(e)). As a result, the controller 200 transitions from the steady mode to the standby mode.

On the other hand, when causing the controller 200 to exit the standby mode, the microcomputer 600 asserts the regulation enable signal RGEN by setting information in the register unit 201, and causes the regulator 202 to generate the analog power supply voltage AVCC (FIG. 3(f)). After starting the generation of the analog power supply voltage AVCC, the generation of the clock signal CLK for the analog circuit starts (FIG. 3(g)).

After waiting for a stabilization period of the clock signal CLK, the microcomputer 600 asserts the clock enable signal CLKEN by setting information in the register unit 201 (FIG. 3(h)). The clock enable signal CLKEN is asserted, and the clock control unit 203 starts generating the clock signals CLK1 and CLK2 (FIG. 3(i)).

After the clock signal CLK stabilizes and the time elapses for the analog front end 220 to stabilize, the microcomputer 600 sequentially asserts the control signals PGACNT, ADCCNT, and DMCNT by sequentially setting information in the register unit 201 (FIGS. 3(j), (k), and (l)). The control signal PGACNT is an example of a first startup control signal, the control signal ADCCNT is an example of a second startup control signal, and the control signal DMCNT is an example of a third startup control signal. The microcomputer 600 asserts the timing signals TCNT1 and TCNT2 by setting information in the register unit 201 (FIG. 3(m)).

By asserting the control signals PGACNT, ADCCNT, and DMCNT, the programmable gain amplifier and the delta-sigma ADC of the analog front end 220, and the demodulator, sequentially start operation. The detection signal processing unit 240 sequentially generates the detection signals LPFDET and DET in response to the detection signal DETO output from the demodulator 230, outputs the generated detection signal LPFDET to the press detector 280, and outputs the generated detection signal DET to the drive signal generator 250.

By asserting the timing signals TCNT1 and TCNT2, the drive signal generator 250 and the auxiliary drive signal generator 260 start operation. In this arrangement, the controller 200 generates the detection signal DET to enter a state capable of generating the auxiliary drive signal SDRV and the press detection signal PUSH, and enters a state capable of detecting the press operation of the touch panel 400. That is, the controller 200 exits the standby mode, and enters the steady mode.

The entering and exiting of the standby mode of the controller 200 shown in FIG. 2 is controlled by various control signals and various timing signals that are generated in accordance with setting values of the register unit 201 that are set through the microcomputer 600. In this arrangement, a period of entering the standby mode and a period of exiting the standby mode include time periods for writing information to the register unit 201, in order to set the various control signals and various timing signals to predetermined logical values.

In this case, as compared with a case where the entering and exiting of the standby mode is autonomously controlled in the controller 200, there is a problem that the period of entering the standby mode and the period of exiting the standby mode become longer. Since the exiting of the standby mode sequentially asserts the control signals PGACNT, ADCCNT, DMCNT, and the timing signals TCNT1 and TCNT2, there is a problem that the period of exiting the standby mode becomes longer. If the period of entering the standby mode and the period of exiting the standby mode become longer, the performance of the system 10 on which the vibration feedback device 100 is mounted may deteriorate.

Moreover, in the vibration feedback device 100 that vibrates the touch panel 400 in response to the distortion caused by the pressing force or the like on the touch panel 400, it is necessary to adjust the waveform of the auxiliary drive signal SDRV in advance according to natural frequencies of the electromagnetic actuator 300 and the touch panel 400. In this arrangement, one or more parameters for adjusting the waveform of the auxiliary drive signal SDRV are stored in a register in a digital circuit block or in a volatile storage such as an SRAM (Static Random Access Memory), according to the natural frequency of each vibration feedback device 100.

If the supply of the power supply voltage DVCC used in the digital circuit block is stopped during the standby mode, waveform data used for generating the auxiliary drive signal SDRV may be lost. For this reason, the microcomputer 600 needs to write the parameters for adjusting the waveform in the controller 200 each time the controller 200 exits the standby mode, and as a result, there is a problem that the period of exiting the standby mode becomes longer.

Block Diagram of Vibration Feedback Device
According to First Embodiment

Figure 4:
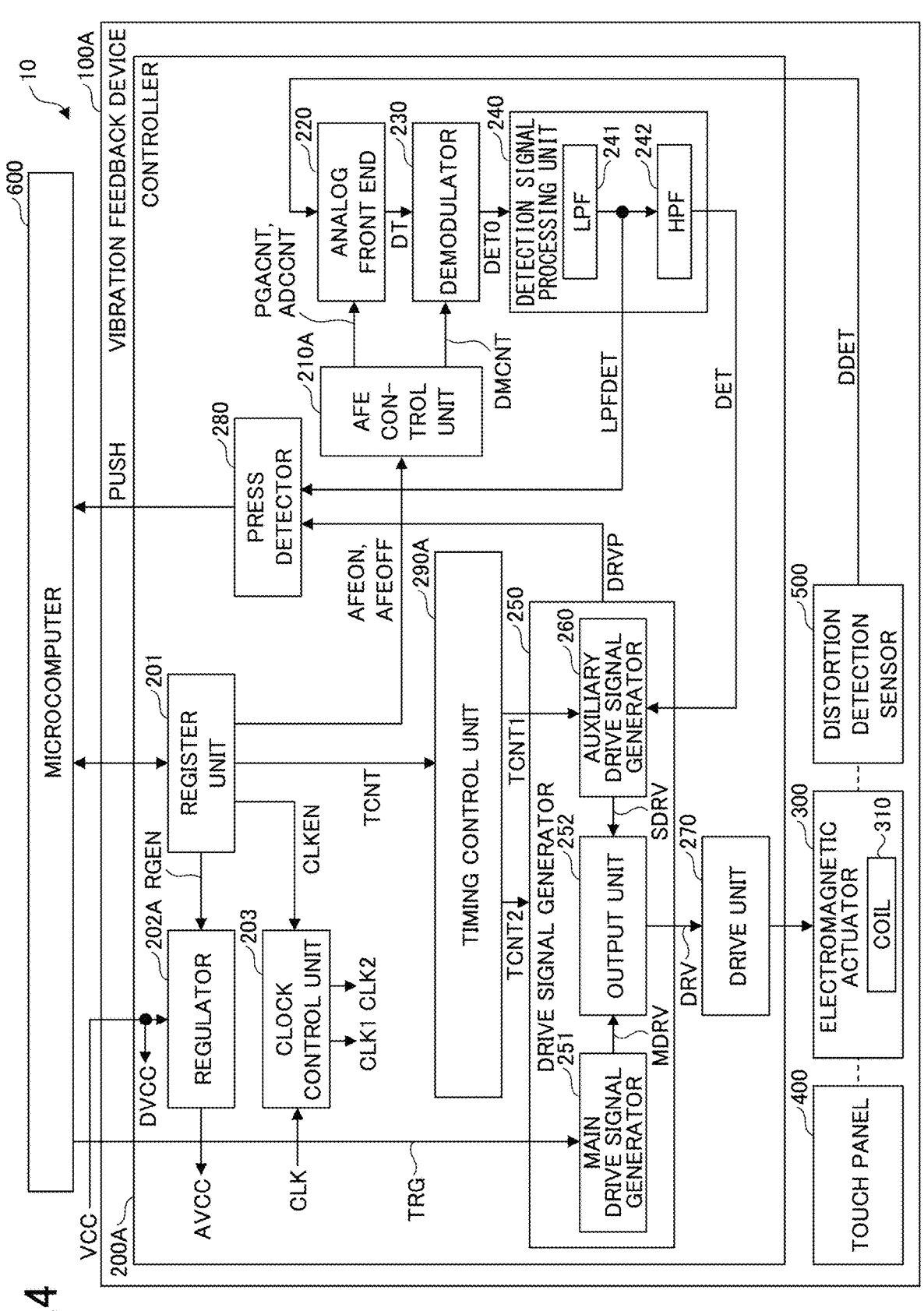
FIG. 4 is a block diagram showing an example of the vibration feedback device including the controller according to a first embodiment.

FIG. 4 is a block diagram showing an example of a vibration feedback device 100A having a controller 200A according to a first embodiment. Components that are similar to those in FIG. 2 are denoted by the same numerals, and detailed description of the components is omitted. FIG. 4 shows the configuration of the system 10 on which the vibration feedback device 100A is mounted. The appearance and structure of the vibration feedback device 100A shown in FIG. 4 are the same as those of the vibration feedback device 100 shown in FIG. 1. The vibration feedback device 100A may operate by power that is supplied from a battery.

The vibration feedback device 100A shown in FIG. 4 has the same configuration as the vibration feedback device 100 shown in FIG. 2, except that the controller 200A is provided instead of the controller 200 shown in FIG. 2. For example, the controller 200A is manufactured as a semiconductor chip, and is mounted on a substrate (not shown) mounted on the vibration feedback device 100A.

The controller 200A has the same configuration as the controller 200 shown in FIG. 2, except that a regulator 202A is provided instead of the regulator 202 of the controller 200 shown in FIG. 2, and that an AFE controller 210A and a timing controller 290A are provided.

The regulator 202A generates the power supply voltage AVCC for an analog circuit block in the steady mode, by using the power supply voltage VCC that is received from the outside, and then the regulator 202A stops generating the power supply voltage AVCC in the standby mode. The power supply voltage AVCC is an example of an analog power supply voltage. The regulator 202A does not have a function of generating the power supply voltage DVCC for a digital circuit block. The power supply voltage VCC is used as the power supply voltage DVCC.

By setting information in the register unit 201, the microcomputer 600 asserts or negates each of the control signals AFEOFF, AFEON, and TCNT. The AFE control unit 210A has a function of generating the control signals PGACNT and ADCCNT for controlling the operation of the analog front end 220; and the control signal DMCNT for controlling the operation of the demodulator 230, based on the control signals AFEOFF and AFEON received from the register unit 201.

The AFE control unit 210A negates the control signals PGACNT, ADCCNT, and DMCNT in response to assertion of the control signal AFEOFF that is set by the microcomputer 600 when the standby mode is entered. The AFE control unit 210A sequentially asserts the control signals PGACNT, ADCCNT, and DMCNT in response to the assertion of the control signal AFEON set by the microcomputer 600.

The timing control unit 290A has a function of generating the timing signals TCNT1 and TCNT2 for controlling the operation of the drive signal generator 250, based on the control signal TCNT received from the register unit 201. The timing control unit 290A negates the timing signals TCNT1 and TCNT2 in response to the negation of the control signal TCNT that is set by the microcomputer 600 when the standby mode is entered. The timing controller 290A asserts the timing signals TCNT1 and TCNT2 in response to the assertion of the control signal TCNT set by the microcomputer 600, when the standby mode is exited.

In the present embodiment, the microcomputer 600 writes a value to assert the control signal AFEON in a predetermined register of the register unit 201, and thus the controller 200A can sequentially assert the control signals PGACNT, ADCCNT, and DMCNT. In addition, the microcomputer 600 writes a value to assert the control signal TCNT in a predetermined register of the register unit 201, and thus the controller 200A can sequentially assert the timing signals TCNT1 and TCNT2. In this arrangement, as compared with the controller 200 shown in FIG. 2, the period of entering the standby mode and the period of exiting the standby mode can be reduced.

In the present embodiment, the power supply voltage DVCC for operating the digital circuit block is constantly supplied to the controller 200A, regardless of operation mode. In this arrangement, one or more parameters for adjusting the waveform of the auxiliary drive signal SDRV according to the natural frequencies of the electromagnetic actuator 300 and the touch panel 400 can be maintained in a register or a volatile storage such as an SRAM, without being lost during the standby mode.

For example, one or more parameters for adjusting the waveform of the auxiliary drive signal SDRV may include value(s) for adjusting one or both of the amplitude and frequency of the auxiliary drive signal SDRV. Since the microcomputer 600 does not need to write the parameters for adjusting the waveform to the controller 200A each time the controller 200A exits the standby mode, the period of exiting the standby mode can be further reduced compared with the controller 200 of FIG. 2. As a result, the performance of the system 10 in which the vibration feedback device 100A is mounted can be improved compared with a case in which the vibration feedback device 100 of FIG. 2 is mounted.

Figure 5:
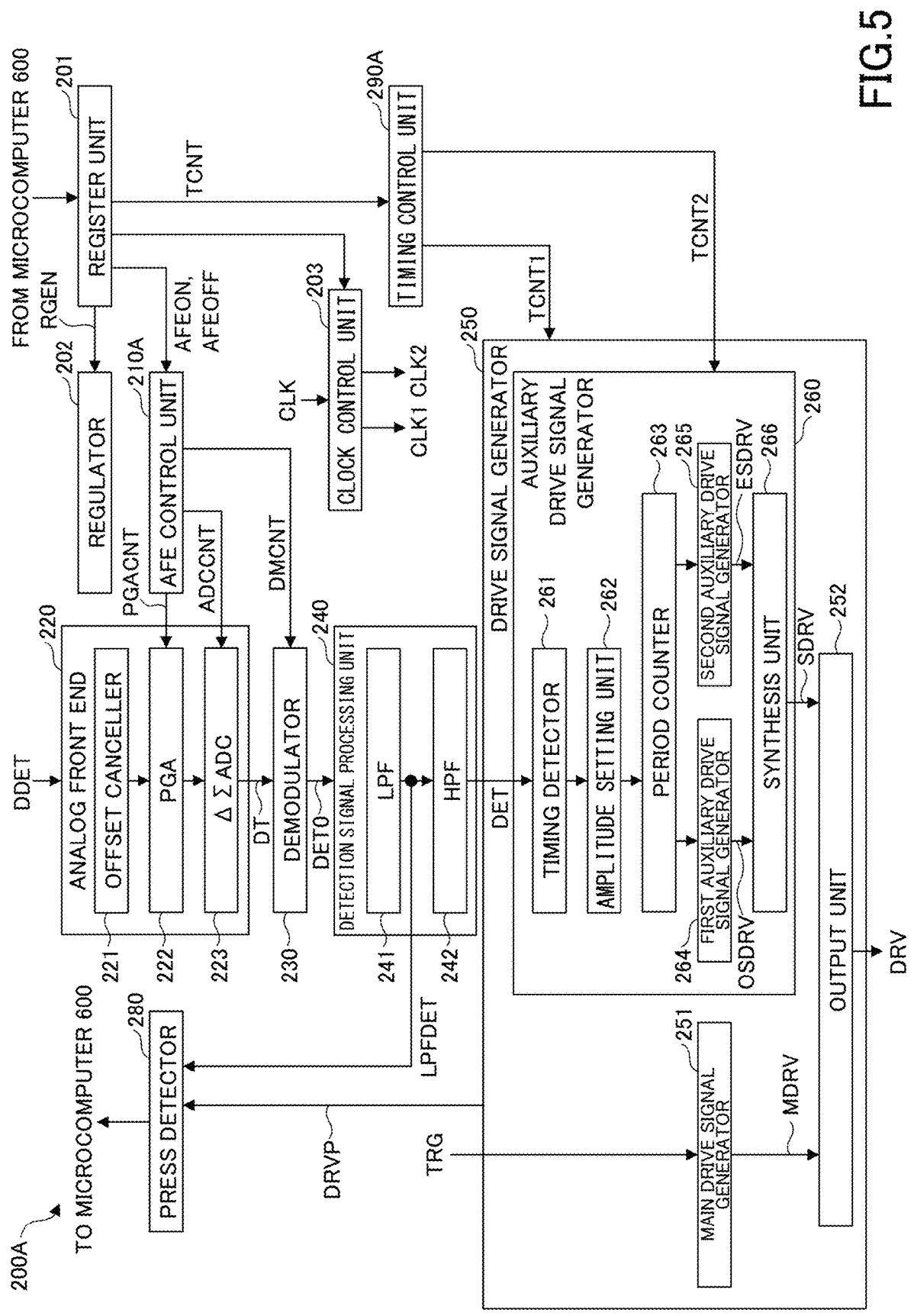
FIG. 5 is a block diagram showing details of the controller of FIG. 4.

FIG. 5 is a block diagram showing the details of the controller 200A of FIG. 4. Detailed description of the components described in FIGS. 2 and 4 is omitted. The analog front end 220 includes an offset canceller 221, a programmable gain amplifier (PGA) 222, and a delta-sigma ADC 223 as described in FIG. 2. The auxiliary drive signal generator 260 includes a timing detector 261, an amplitude setting unit 262, a period counter 263, a first auxiliary drive signal generator 264, a second auxiliary drive signal generator 265, and a synthesis unit 266.

The offset canceller 221 cancels the offset of the detection signal DDET (analog signal) indicating the amount of distortion detected by the distortion detection sensor 500, and outputs a result to the programmable gain amplifier 222.

The programmable gain amplifier 222 operates during the assertion of the control signal PGACNT to amplify the detection signal DDET whose offset has been canceled. The programmable gain amplifier stops operating during the negation of the control signal PGACNT. The programmable gain amplifier 222 is an example of an amplifier circuit.

The delta-sigma ADC 223 operates during the assertion of the control signal ADCCNT, generates a serial data signal DT in response to a change in the voltage of the amplified detection signal DDET, and outputs the generated serial data signal DT to the demodulator 230. The delta-sigma ADC stops operating during the negation of the control signal ADCCNT.

The timing detector 261 detects a peak timing and a bottom timing of the detection signal DET from the detection signal processing unit 240, or a set of the peak timing, the bottom timing, and a zero-cross timing, and outputs a result to the amplitude setting unit 262 as a timing signal. The timing signal is also output to the period counter 263.

The amplitude setting unit 262 sets the amplitude of the auxiliary drive signal based on the timing signal from the timing detector 261, and outputs amplitude information indicating the set amplitude to the period counter 263. By referring to a data table stored in a storage unit of the controller 200A and using information indicated by the timing signal from the timing detector 261, the amplitude setting unit 262 may, for example, set the amplitude of the auxiliary drive signal.

The period counter 263 counts a period of the auxiliary drive signal SDRV based on the timing signal from the timing detector 261. The period counter 263, for example, instructs the first auxiliary drive signal generator 264 to generate the auxiliary drive signal SDRV during odd-numbered periods, and instructs the second auxiliary drive signal generator 265 to generate the auxiliary drive signal SDRV during even-numbered periods.

For example, the first auxiliary drive signal generator 264 and the second auxiliary drive signal generator 265 are sine wave generators. The first auxiliary drive signal generator 264 generates the auxiliary drive signal SDRV of one period of the sine wave based on the instruction from the period counter 263, and outputs the auxiliary drive signal SDRV of one period of the sine wave to the synthesis unit 266. The second auxiliary drive signal generator 265 generates a sinusoidal auxiliary drive signal SDRV of one period based on the instruction from the period counter 263, and outputs the sinusoidal auxiliary drive signal SDRV to the synthesis unit 266. In this arrangement, the auxiliary drive signal SDRV can be suppressed from being interrupted or rapidly changed at a transition point between periods of the auxiliary drive signal SDRV, and thus the auxiliary drive signal SDRV that changes smoothly can be generated. The first auxiliary drive signal generator 264 and the second auxiliary drive signal generator 265 may be cosine wave generators.

The synthesis unit 266 synthesizes the auxiliary drive signal OSDRV of odd-numbered periods generated by the first auxiliary drive signal generator 264, and the auxiliary drive signal ESDRV of even-numbered periods generated by the second auxiliary drive signal generator 265, and outputs a result to the output unit 252 as a waveform sequence of the auxiliary drive signal SDRV. The output unit 252 outputs either the main drive signal MDRV from the main drive signal generator 251 or the auxiliary drive signal SDRV from the auxiliary drive signal generator 260, as the drive signal DRV, to the drive unit 270 of FIG. 4.

(Operational Timing of Controller in FIG. 4)

Figure 6:
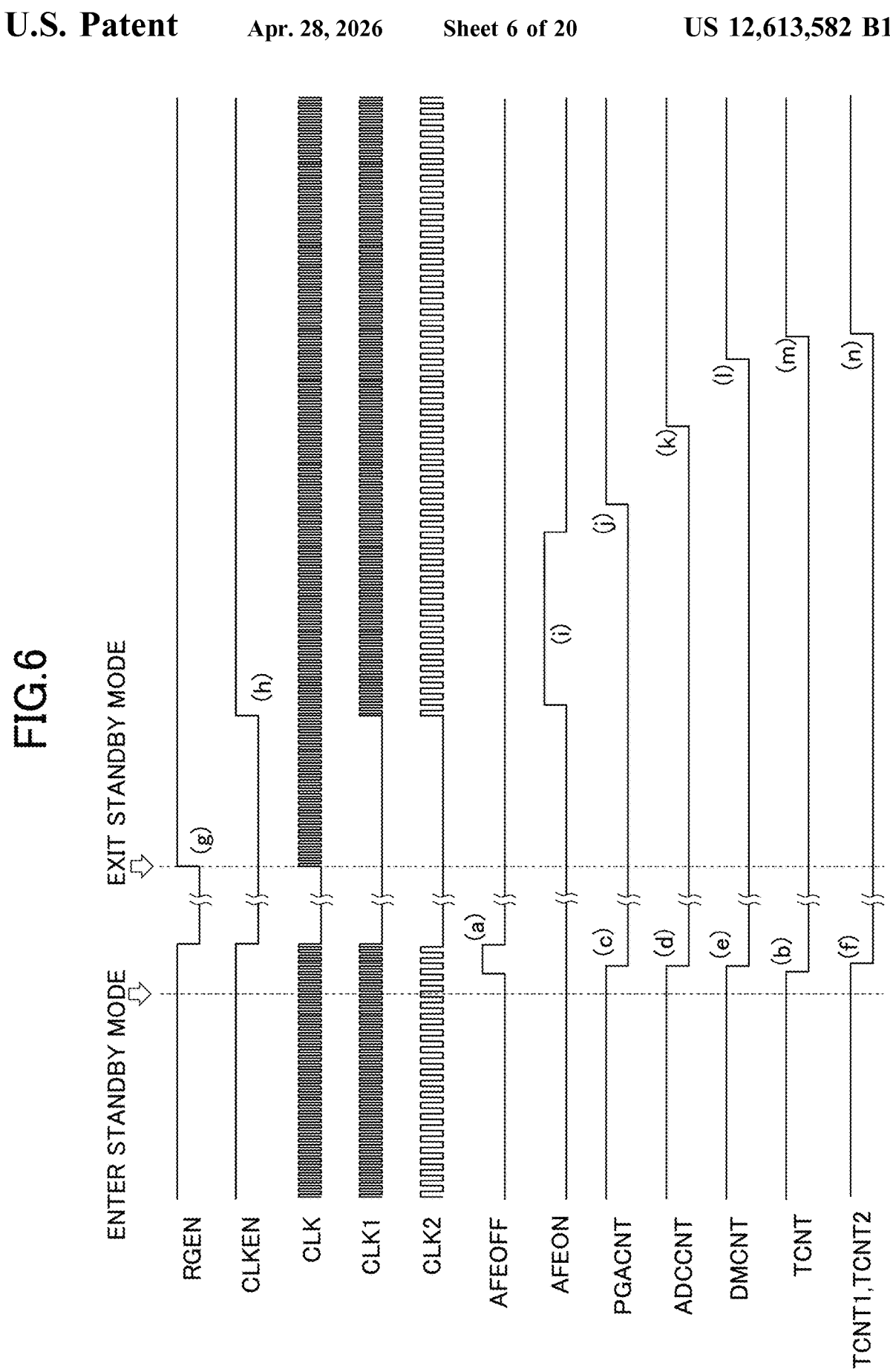
FIG. 6 is a timing diagram showing an example of controlling the transition to and from the standby mode of the controller of FIG. 4.

FIG. 6 is a timing diagram showing an example of controlling entering and exiting the standby mode of the controller 200A of FIG. 4. Detailed description of the same operation as in FIG. 3 is omitted. When causing the controller 200A to enter the standby mode, or when causing the controller 200A to exit the standby mode, the microcomputer 600 accesses the register unit 201 and negates or asserts the regulation enable signal RGEN, the clock enable signal CLKEN, and the control signals AFEON, AFEOFF, and TCNT.

The negation timing and assertion timing of each of the regulator enable signal RGEN and the clock enable signal CLKEN are the same as those in FIG. 3. The waveforms of the clock signals CLK, CLK1, and CLK2 are the same as those in FIG. 3. The waveforms of the control signals PGACNT, ADCCNT, DMCNT, TCNT1, and TCNT2 are the same as those in FIG. 3.

The control signals PGACNT, ADCCNT, and DMCNT are generated by the AFE controller 210A, and the control signals TCNT1 and TCNT2 are generated by the timing controller 290A. The microcomputer 600 does not need to directly control the assertion and negation of the control signals PGACNT, ADCCNT, DMCNT, TCNT1, and TCNT2. In this arrangement, it is possible to reduce the number of accesses (procedures) by the microcomputer 600 to the register unit 201 for entering and exiting the standby mode, and the time required for entering and exiting the standby mode can be reduced as compared with FIG. 3.

When the controller 200A enters the standby mode, the microcomputer 600 causes the control signal AFEOFF to be asserted for a predetermined time period, and causes the control signal TCNT to be negated (FIGS. 6(a) and (b)). The AFE controller 210A negates the control signals PGACNT, ADCCNT, and DMCNT in response to the assertion of the control signal AFEOFF (FIG. 6(c), (d), and (e)). The timing control unit 290A negates the timing signals TCNT1 and TCNT2 in response to the negation of the control signal TCNT (FIG. 6(f)). Then, as in FIG. 3, the controller 200A transitions from the steady mode to the standby mode.

When causing the controller 200A to exit the standby mode, the microcomputer 600 asserts the clock enable signal CLKEN after a predetermined time period has elapsed from asserting the regulation enable signal RGEN, and then the microcomputer 600 asserts the control signal AFEON for a predetermined time period (FIG. 6(g), (h), and (i)). The AFE control unit 210A waits until the analog front end 220 stabilizes based on the assertion period of the control signal AFEON, and then the AFE control unit 210A sequentially asserts the control signals PGACNT, ADCCNT, and DMCNT in response to the negation of the control signal AFEON (FIGS. 6(j), (k), and (l)).

After asserting the control signal AFEON, the microcomputer 600 waits until the analog front end 220 and the demodulator 230 become operational normally, and then the microcomputer 600 asserts the control signal TCNT (FIG. 6(m)). The timing control unit 290A asserts the timing signals TCNT1 and TCNT2 in response to the assertion of the control signal TCNT (FIG. 6(n)). Upon the assertion of the timing signals TCNT1 and TCNT2, the drive signal generator 250 and the auxiliary drive signal generator 260 start operation, and the controller 200A exits the standby mode, and enters the steady mode as shown in FIG. 3.

In the present embodiment, the power supply voltage DVCC is constantly supplied to the digital circuit block using the power supply voltage VCC. In this arrangement, even if the clock signals CLK1 and CLK2 are stopped during the standby mode, one or more parameters for adjusting the waveform of the auxiliary drive signal SDRV can be maintained in a register or a storage unit such as SRAM in the digital circuit block. In this case, since the microcomputer 600 does not need to write the parameters for adjusting the waveform to the controller 200 each time the controller 200 exits the standby mode, the period of exiting the standby mode can be further reduced, compared with the release period used for the controller 200 in FIG. 2.

As described above, in the first embodiment, the number of accesses (procedures) by the microcomputer 600 to the register unit 201 for entering and exiting the standby mode can be reduced, and a time period required for entering and exiting the standby mode can be reduced. Moreover, since the power supply voltage DVCC is supplied to the digital circuit block during the standby mode, the parameters for adjusting the waveform of the auxiliary drive signal SDRV can be maintained in a register or a storage unit such as SRAM in the digital circuit block. In this arrangement, since the microcomputer 600 does not need to write the parameters for adjusting the waveform to the controller 200 each time the controller 200 exits the standby mode, the period of exiting the standby mode can be further reduced.

Second Embodiment

Figure 7:
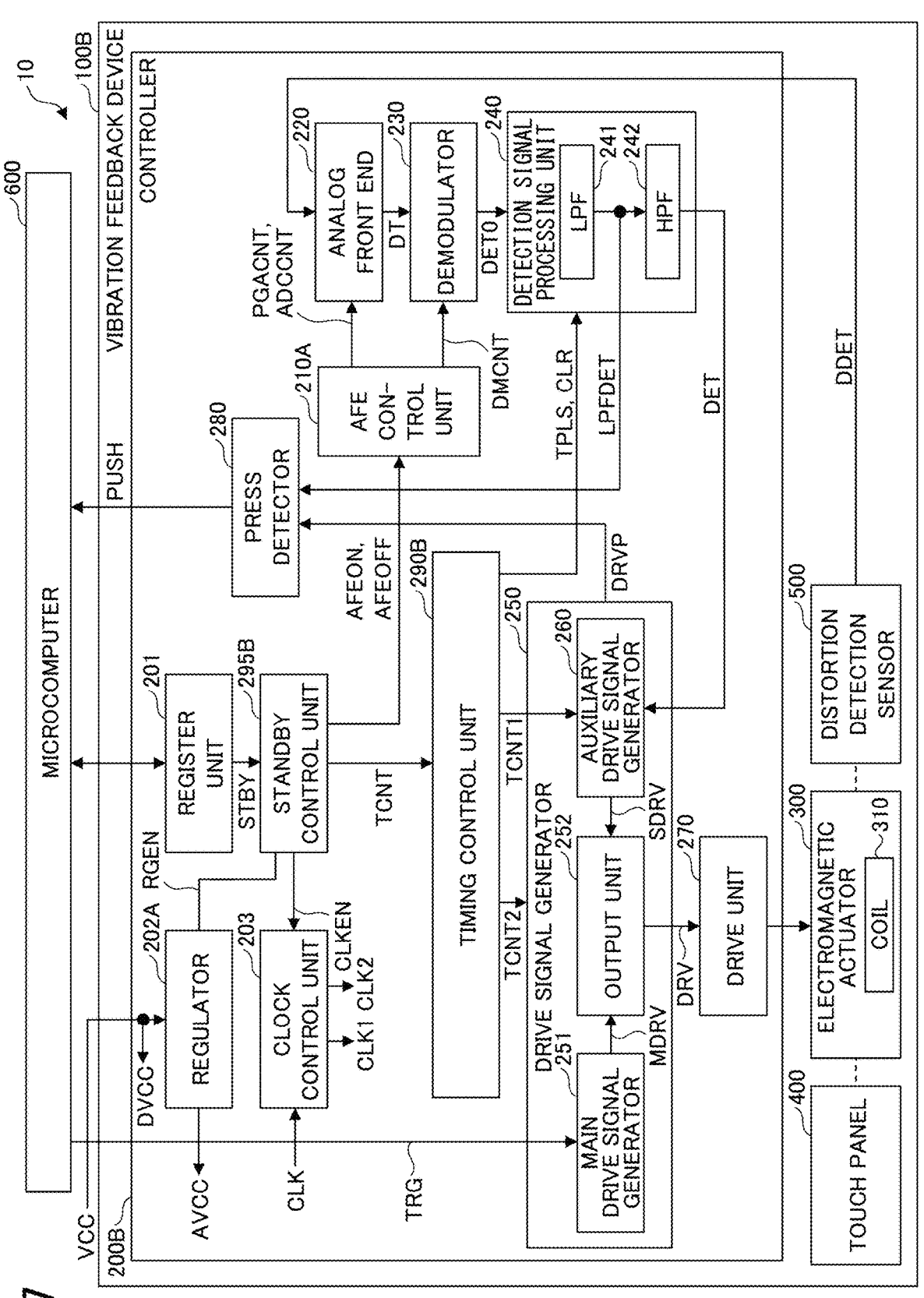
FIG. 7 is a block diagram showing an example of the vibration feedback device including the controller according to a second embodiment.

FIG. 7 is a block diagram showing an example of a vibration feedback device 100B having a controller 200B according to a second embodiment. Components that are similar to those in FIGS. 2 and 4 are denoted by the same numerals, and detailed description of the components is omitted. FIG. 7 shows the configuration of the system 10 in which the vibration feedback device 100B is mounted. The appearance and structure of the vibration feedback device 100B shown in FIG. 7 are the same as those of the vibration feedback device 100 shown in FIG. 1. The vibration feedback device 100B may operate by power that is supplied from a battery.

The vibration feedback device 100B shown in FIG. 7 has the same configuration as the vibration feedback device 100A shown in FIG. 4, except that the vibration feedback device 100B has a controller 200B instead of the controller 200A shown in FIG. 4. The controller 200B has the same configuration as the controller 200A shown in FIG. 4, except that the vibration feedback device 100B has a timing control unit 290B instead of the timing control unit 290A of the controller 200A shown in FIG. 4, and that the vibration feedback device 100B further has a standby control unit 295B. The AFE control unit 210A, the timing control unit 290B, and the standby control unit 295B are examples of mode control units. For example, the analog front end 220 is included in an analog circuit block, and the standby control unit 295B, the timing control unit 290B, and the AFE control unit 210A are included in a digital circuit block.

In addition to the function of the timing control unit 290A shown in FIG. 4, the timing control unit 290B has a function of outputting a timing pulse signal TPLS and a clear signal CLR to the detection signal processing unit 240 during the standby mode. The timing pulse signal TPLS is a synchronization signal to cause the detection signal processing unit 240 to perform filtering processing of the detection signal DETO, and the timing pulse signal TPLS is output with a predetermined period during the steady mode. The clear signal CLR is asserted during the standby mode. The detection signal processing unit 240 clears a result of the filtering processing during the assertion of the clear signal CLR, thereby suppressing the supply of invalid filtering result data to the auxiliary drive signal generator 260 as the detection signal DET. An example of a timing at which each of the timing pulse signal TPLS and the clear signal CLR is generated by the timing control unit 290B is shown in FIG. 8.

The standby control unit 295B has a function of outputting the regulation enable signal RGEN, the clock enable signal CLKEN, and the control signals AFEOFF, AFEON, and TCNT, in response to the standby signal STBY that is received from the register unit 201. When causing the controller 200B to enter the standby mode, the microcomputer 600 asserts the standby signal STBY by setting information in the register unit 201. When causing the controller 200B to exit the standby mode, the microcomputer 600 negates the standby signal STBY by setting information in the register unit 201. The standby signal STBY is an example of a release signal indicating the exit from the standby mode. An example of the operation of the standby control unit 295B is shown in FIG. 8.
(Operational Timing of Controller in FIG. 7)

Figure 8:
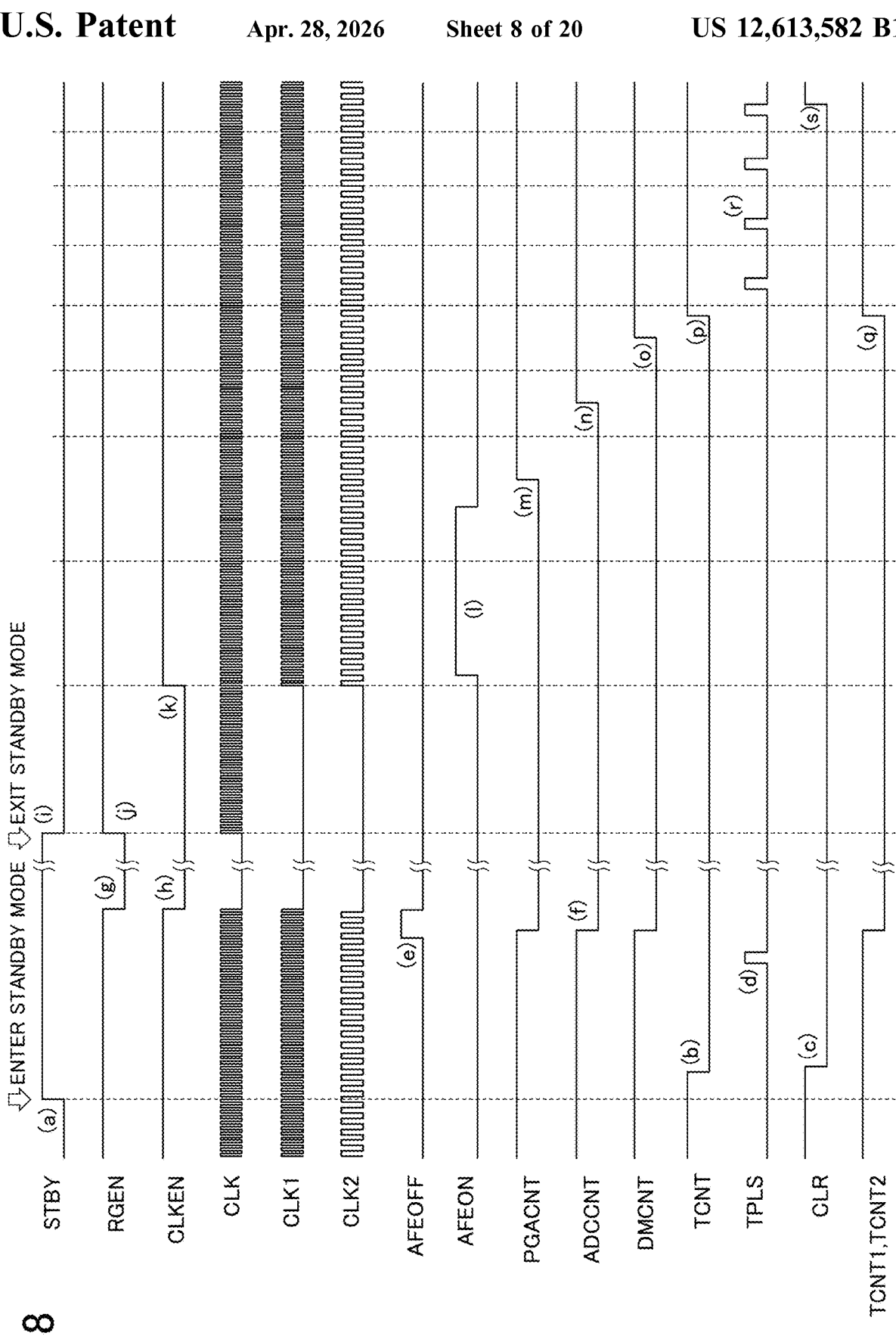
FIG. 8 is a timing diagram showing an example of controlling the transition to and from the standby mode of the controller of FIG. 7.

FIG. 8 is a timing diagram showing an example of controlling entering and exiting the standby mode of the controller 200B in FIG. 7. Detailed description of the same operation as in FIGS. 3 and 6 is omitted.

When causing the controller 200B to enter the standby mode, the microcomputer 600 accesses the register unit 201 to assert the standby signal STBY (FIG. 8(a)). The standby control unit 295B negates the control signal TCNT in response to the assertion of the standby signal STBY (FIG. 8(b)). The timing control unit 290B asserts the clear signal CLR in response to the negation of the control signal TCNT (FIG. 8(c)). During the assertion of the clear signal CLR, the detection signal processing unit 240 masks the input of the detection signal DETO by the low-pass filter 241, and suppresses the filtering of the detection signal DETO. The timing control unit 290B periodically outputs the timing pulse signal TPLS (FIG. 8(d)). The detection signal processing unit 240 clears the internally held data in response to the timing pulse signal TPLS after the assertion of the standby signal STBY.

Next, the standby control unit 295B asserts the control signal AFEOFF for a predetermined time period, and causes the AFE control unit 210A to negate the control signals PGACNT, ADCCNT, and DMCNT (FIGS. 8(e) and (f)). Next, the standby control unit 295B negates the regulation enable signal RGEN and the clock enable signal CLK (FIGS. 8(g) and (h)). Then, as in FIGS. 3 and 6, the controller 200B transitions from the steady mode to the standby mode.

On the other hand, when causing the controller 200B to exit the standby mode, the microcomputer 600 accesses the register unit 201 to negate the standby signal STBY (FIG. 8(i)). The standby control unit 295B sequentially asserts the regulation enable signal RGEN and the clock enable signal CLKEN in response to the negation of the standby signal STBY (FIGS. 8(j) and (k)). The standby control unit 295B asserts the control signal AFEON for a predetermined time period after the assertion of the standby signal STBY, and causes the AFE control unit 210A to sequentially assert the control signals PGACNT, ADCCNT, and DMCNT (FIGS. 8(l), (m), (n), and (o)).

Next, the standby control unit 295B asserts the control signal TCNT (FIG. 8(p)). The timing control unit 290B asserts the control signals TCNT1 and TCNT2 in response to the assertion of the control signal TCNT, and causes the drive signal generator 250 to start the operation (FIG. 8(q)).

The timing control unit 290B periodically outputs the timing pulse signal TPLS (FIG. 8(r)). Since the clear signal CLR is asserted, the detection signal processor 240 clears a result of the filtering processing of an invalid detection signal DETO from the demodulator 230. In this arrangement, it is possible to suppress the supply of the invalid detection signal DET from the detection signal processor 240 to the auxiliary drive signal generator 260, to thereby suppress the erroneous driving of the electromagnetic actuator 300.

The timing control unit 290B outputs a predetermined number of timing pulse signals TPLS (four timing pulse signals in FIG. 8), and then negates the clear signal CLR (FIG. 8(s)). At least one timing pulse signal TPLS that is output before negating the clear signal CLR may be used. For example, an output timing of the four timing pulse signals TPLS corresponds to an output timing of a normal detection signal DETO from the demodulator 230 after exiting the standby mode. In this arrangement, the detection signal processor 240 can clear the data resulting from the invalid filtering process when exiting the standby mode.

Then, the detection signal processor 240 can filter the normal detection signal DETO in synchronization with a subsequent timing pulse signal TPLS, output the normal detection signal LPFDET to the press detector 280, and output the normal detection signal DET to the auxiliary drive signal generator 260. In this arrangement, the auxiliary drive signal generator 260 can generate the normal auxiliary drive signal SDRV based on the normal detection signal DET, and can suppress malfunction of the electromagnetic actuator 300.

As described above, in the second embodiment, the number of accesses (procedures) by the microcomputer 600 to the register unit 201 to exit the standby mode can be further reduced compared with the first embodiment, and a time period required for exiting the standby mode can be reduced. In addition, as in the first embodiment, one or more parameters for adjusting the waveform of the auxiliary drive signal SDRV can be maintained in a register or a storage unit such as SRAM in the digital circuit block, and the time period required for exiting the standby mode can be further reduced.

In addition, in the second embodiment, when the standby mode is exited, a predetermined number of timing pulse signals TPLS are output to the detection signal processor 240, and then the clear signal CLR is negated. In this arrangement, the detection signal processing unit 240 can clear invalid data when exiting the standby mode, perform filtering processing of the normal detection signal DETO after exiting the standby mode, and output normal detection signals LPFDET and DET. As a result, the auxiliary drive signal generator 260 can generate the normal auxiliary drive signal SDRV based on the normal detection signal DET, and can suppress malfunction of the electromagnetic actuator 300. The press detector 280 can normally detect the press operation of the touch panel 400 based on the normal detection signal LPFDET.

The following items are described.
[1] A controller for controlling an actuator that applies vibration to an operation device based on operation of the operation device and for switching between a steady mode and a low power mode, including:
  a converter configured to convert, into a first digital signal, a detection signal output from a sensor that detects displacement of the operation device due to pressing or vibration of the operation device;
  a detection signal processing unit configured to remove noise from the first digital signal, and generate a second digital signal;
  a drive signal generator configured to: generate a first drive signal to drive the actuator when pressing of the operation device is detected based on a signal obtained by removing an offset from the second digital signal; and generate a second drive signal to drive the actuator when vibration of the operation device is detected based on the second digital signal after generation of the first drive signal; and
  a mode control unit configured to sequentially generate, based on reception of a release signal indicating an exit of the low power mode, a plurality of startup control signals to respectively activate the converter, the detection signal processing unit and the drive signal generator, which are to be stopped in the low power mode.
[2] In a controller in [1], a detection signal processing unit is configured to: generate a second digital signal each time a pulse signal is received during steady mode and clear the generated second digital signal while receiving the clear signal, and a mode control unit is configured to output the pulse signal to a detection signal processing unit at predetermined intervals during steady mode, stop output of the pulse signal to the detection signal processing unit during low power mode, and stop output of the clear signal after outputting one or more of pulse signals based on reception of a release signal.

[3] In a controller in [1], the controller includes a volatile storage unit that holds a parameter for adjusting a waveform of a second drive signal according to a frequency of an actuator connected to an operation device, and the storage unit is configured to receive a power supply voltage during low power mode, and keep the parameter held.

[4] A controller in any one of [1] to [3] includes:

an analog circuit block including a converter;

a digital circuit block including a detection signal processing unit, a drive signal generator, and a mode control unit;

a regulator configured to generate an analog power supply voltage to be supplied to the analog circuit block based on a power supply voltage, and stop operation during low power mode; and a clock generator configured to generate a second clock signal to be used in the digital circuit block from a first clock signal to be used in the analog circuit block, and stop the operation during the low power mode, where the mode control unit is configured to sequentially generate a regulator enable signal for operating the regulator and a clock enable signal for operating the clock generator, before generating a plurality of startup control signals based on reception of a release signal.

[5] A controller in any one of [1] to [3], a converter includes:

an offset canceler configured to cancel an offset of a detection signal;

an amplifier circuit configured to amplify a detection signal whose offset has been canceled;

a delta-sigma analog digital conversion circuit configured to convert the amplified detection signal into a serial data signal; and a demodulator configured to demodulate the serial data signal to generate a first digital signal, where the mode control unit is configured to sequentially generate a first startup control signal for starting the amplifier circuit, a second startup control signal for starting the delta-sigma analog digital conversion circuit, and a third startup control signal for starting the demodulator based on reception of a release signal, before starting the drive signal generator.

[6] A vibration feedback device includes:

an operation device;

an actuator configured to apply vibration to an operation device based on operation of the operation device; and a controller configured to control the actuator and switch between steady mode and low power mode. The controller includes:

a converter configured to convert, into a first digital signal, a detection signal output from a sensor that detects displacement of the operation device due to pressing or vibration of the operation device;

a detection signal processing unit configured to remove noise from the first digital signal, and generate a second digital signal;

a drive signal generator configured to: generate a first drive signal to drive the actuator when pressing of the operation device is detected based on a signal obtained by removing an offset from the second digital signal; and generate a second drive signal to drive the actuator when vibration of the operation device is detected based on the second digital signal after generation of the first drive signal; and a mode control unit configured to sequentially generate, based on reception of a release signal indicating an exit of the low power mode, a plurality of startup control signals to respectively activate the converter, the detection signal processing unit, and the drive signal generator, which are to be stopped in the low power mode.

Third Embodiment

A controller mounted on a type of haptic interface in the related art has, for example, a detector that detects vibration detected by a sensor, which is connected to an operation device, and that relates to pressing or a press-and-hold operation (release from pressing) of the operation device; and a pulse generator that generates a drive pulse signal based on the detection by the detector. The sensor detects not only the vibration caused by the operation of the operation device but also the vibration of the operation device caused by the drive pulse signal. In this case, the detector may erroneously detect the vibration of the operation device caused by the drive pulse signal, as the vibration caused by the pressing or the press-and-hold operation of the operation device. If the detector erroneously detects the vibration, since a normal drive pulse signal is not generated, there is a possibility that uncomfortable vibrations are transmitted to a user operating the operation device.

An object of the disclosed technique related with a controller that is mounted on a vibration feedback device that applies vibration to an operation device based on detection of contact with the operation device, is to suppress false detection of pressing or a press-and-hold operation of the operation device.

(Block Diagram of Vibration Feedback Device)

Figure 9:
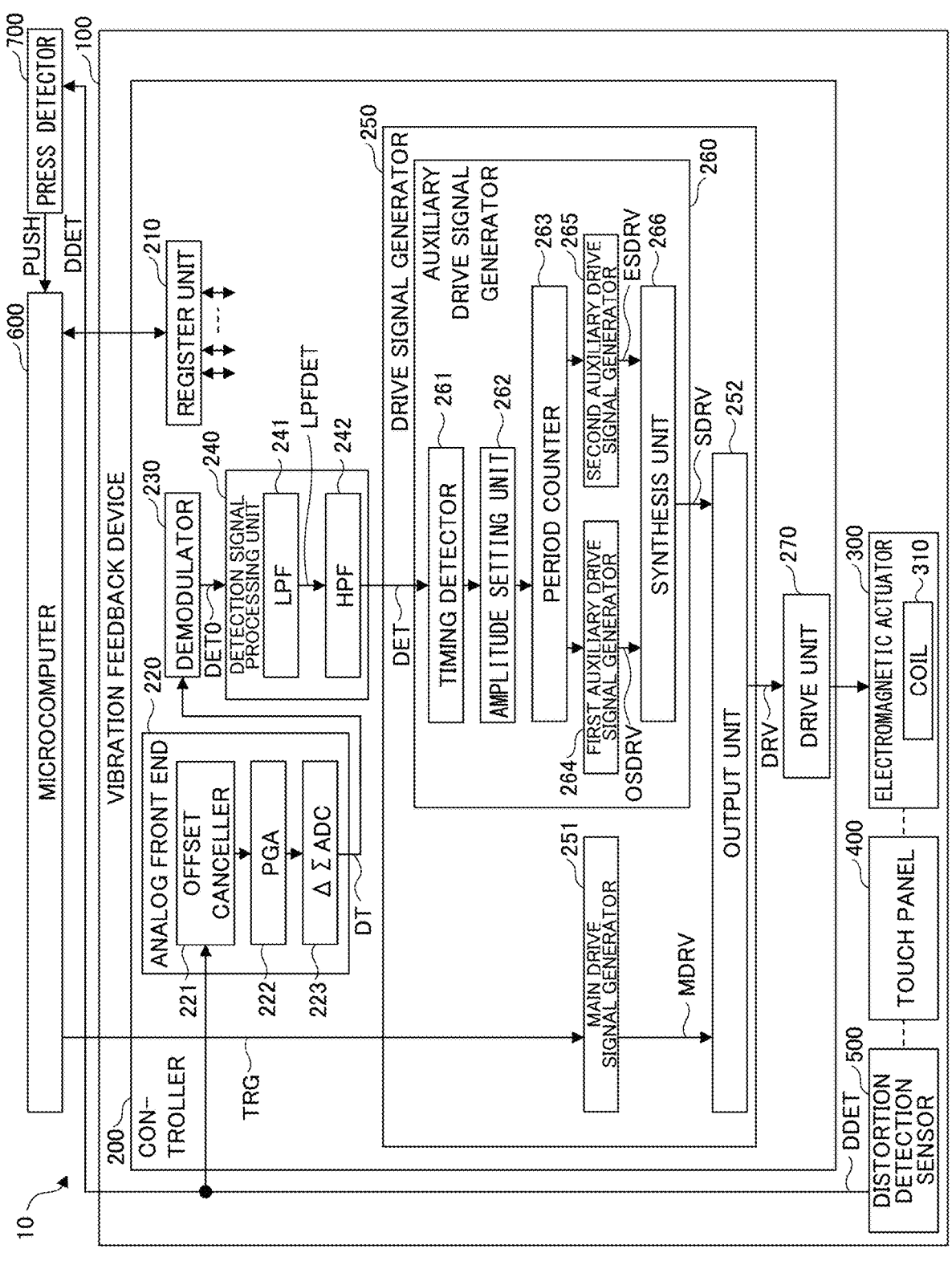
FIG. 9 is a block diagram showing an example of the vibration feedback device of FIG. 1.

FIG. 9 is a block diagram showing an example of the vibration feedback device 100 shown in FIG. 1. FIG. 9 shows the configuration of a system 10 on which the vibration feedback device 100 is mounted. The system 10 includes the vibration feedback device 100, a microcomputer 600, and a press detector 700. For example, the microcomputer 600 and the press detector 700 may be mounted on a system board that is provided in the system 10. For example, the press detector 700 may be mounted on the system board as a single component. The vibration feedback device 100 shown in FIG. 9 has been proposed by the inventor of this application, and is not publicly known. A problem of the vibration feedback device 100 will be described with reference to FIG. 10.

The vibration feedback device 100 includes a controller 200, an electromagnetic actuator 300 including a coil 310, a touch panel 400, and a distortion detection sensor 500. The distortion detection sensor 500 supported on the movable plate 104 in FIG. 1, together with the touch panel 400, detects the displacement of the touch panel 400 in response to pressing or a press-and-hold operation of the touch panel 400, or to vibration by the electromagnetic actuator 300.

The controller 200 includes a register unit 210, an analog front end 220, a demodulator 230, a detection signal processing unit 240, a drive signal generator 250, and a drive unit 270. The analog front end 220 includes an offset canceller 221, a programmable gain amplifier (PGA) 222, and a delta-sigma ADC (Analog-to-Digital Converter) 223. The detection signal processing unit 240 includes a low-pass filter (LPF) 241 and a high-pass filter (HPF) 242.

The drive signal generator 250 includes a main drive signal generator 251, an auxiliary drive signal generator 260, and an output unit 252. The auxiliary drive signal generator 260 includes a timing detector 261, an amplitude setting unit 262, a period counter 263, a first auxiliary drive signal generator 264, a second auxiliary drive signal generator 265, and a synthesis unit 266. The controller 200 operates in synchronization with a clock signal that is a system clock for the vibration feedback device 100. Description of the clock signal is omitted.

The register unit 210 has a plurality of registers that are read from and written to using the microcomputer 600. Although not particularly limited, the microcomputer 600 can access the register unit 210 via, for example, an inter-integrated circuit (I2C) interface. A state of the controller 200 may be set by various control signals that are output from the registers, in accordance with setting value(s) of the register unit 210 that are written using the microcomputer 600.

In the analog front end 220, the offset canceller 221 cancels an offset of the detection signal DDET (analog signal) indicating an amount of distortion detected by the distortion detection sensor 500, and outputs a result to the programmable gain amplifier 222. The programmable gain amplifier 222 amplifies the detection signal DDET whose offset has been canceled. The delta-sigma ADC generates a serial data signal DT in response to a change in the voltage of the amplified detection signal DDET, and outputs the generated serial data signal DT to the demodulator 230. The detection signal DDET is an example of a first detection signal. The programmable gain amplifier 222 is an example of an amplifier circuit.

The demodulator 230 sequentially demodulates the serial data signal DT received from the delta-sigma ADC while shifting bit positions, and generates a plurality of detection signals DETO each of which indicates an amount of distortion of the touch panel 400. The demodulator 230 sequentially outputs the generated detection signals DETO to the detection signal processor 240.

The low-pass filter 241 of the detection signal processor 240 performs noise removal processing of each detection signal DETO received from the demodulator 230, and then the low-pass filter 241 outputs a result to the high-pass filter 242 as a detection signal LPFDET. The high-pass filter 242 performs offset removal processing of the detection signal LPFDET from which the noise received from the low-pass filter 241 has been removed, and then the high-pass filter 242 outputs a result to the auxiliary drive signal generator 260 as a detection signal DET. The detection signal DETO is an example of a first digital signal, and the detection signals LPFDET and DET are examples of a second digital signal.

The main drive signal generator 251 of the drive signal generator 250 generates the main drive signal MDRV in response to a trigger signal TRG received from the microcomputer 600, and outputs the generated main drive signal MDRV to the output unit 252. Although not particularly limited, for example, the main drive signal MDRV may be a square wave. The trigger signal TRG is an example of a drive startup signal.

The timing detector 261 of the auxiliary drive signal generator 260 detects a peak timing and a bottom timing of the waveform of the detection signal DET from the detection signal processing unit 240, or, a set of the peak timing, the bottom timing, and a zero-cross timing. Then, the timing detector 261 outputs a result to the amplitude setting unit 262 as a timing signal. The timing signal is also output to the period counter 263.

The amplitude setting unit 262 sets the amplitude of the auxiliary drive signal based on the timing signal from the timing detector 261, and outputs amplitude information indicating the set amplitude to the period counter 263. The amplitude setting unit 262 may, for example, set the amplitude of the auxiliary drive signal by referring to a data table that is stored in a storage unit of the controller 200A, and by using information indicated by the timing signal from the timing detector 261.

The period counter 263 counts a period of the auxiliary drive signal SDRV based on the timing signal from the timing detector 261. Then, for example, the period count unit 263 instructs the first auxiliary drive signal generator 264 to generate the auxiliary drive signal SDRV during odd-numbered periods, and instructs the second auxiliary drive signal generator 265 to generate the auxiliary drive signal SDRV during even-numbered periods.

For example, the first auxiliary drive signal generator 264 and the second auxiliary drive signal generator 265 are sine wave generators. Based on an instruction from the period count unit 263, the first auxiliary drive signal generator 264 generates the auxiliary drive signal SDRV of one period of the sine wave, and outputs the result to the synthesis unit 266. Based on the instruction from the period count unit 263, the second auxiliary drive signal generator 265 generates the auxiliary drive signal SDRV of one period of the sine wave, and outputs a result to the synthesis unit 266. In this arrangement, the auxiliary drive signal SDRV can be suppressed from being interrupted or changing rapidly at a transition point between periods of the auxiliary drive signals SDRV, and the auxiliary drive signal SDRV that changes smoothly can be generated. The first auxiliary drive signal generator 264 and the second auxiliary drive signal generator 265 may be cosine wave generators.

The synthesis unit 266 synthesizes the auxiliary drive signal OSDRV of the odd-numbered periods generated by the first auxiliary drive signal generator 264, and the auxiliary drive signal ESDRV of the even-numbered periods generated by the second auxiliary drive signal generator 265, and then the synthesis unit 266 outputs a result to the output unit 252 as a waveform sequence of the auxiliary drive signal SDRV. The output unit 252 outputs either the main drive signal MDRV from the main drive signal generator 251, or the auxiliary drive signal SDRV from the auxiliary drive signal generator 260 to the drive unit 270 as a drive signal DRV.

The drive unit 270 drives the electromagnetic actuator 300 in response to the drive signal DRV from the output unit 252. While the electromagnetic actuator 300 is driven, the touch panel 400 moves toward the electromagnetic actuator 300, together with the distortion detection sensor 500, in response to the magnetic force that is generated using the coil 310 that is mounted on the electromagnetic actuator 300.

The press detector 700 that is provided outside the vibration feedback device 100 detects the vibration of the touch panel 400 based on the detection signal DDET indicating an amount of distortion detected by the distortion detection sensor 500. The press detector 700 outputs a press signal PUSH to the microcomputer 600 when the press operation or the exit of the press operation of the touch panel 400 is detected based on the detected vibration.

Here, the press operation is detected based on the fact that the touch panel 400 is pressed by a user's finger or the like. The exit of the press operation is detected based on the fact that the user's finger or the like is released from the touch panel 400 and the press-and-hold operation of the touch panel 400 is performed (released from pressing).

For example, the press detector 700 changes the press detection signal PUSH to a high level when the press detector 700 detects the press operation, and changes the press detection signal PUSH to a low level when the press detector 700 detects the press-and-hold operation. A high-level press detection signal PUSH is an example of a first press detection signal, and a low-level press detection signal PUSH is an example of a second press detection signal.

The microcomputer 600 outputs the trigger signal TRG to the vibration feedback device 100 in response to a rising edge and a falling edge of the press detection signal PUSH. The press detection signal PUSH may be communicated to the microcomputer 600 as an interrupt signal. The operation of the press detector 700 will be described in detail with reference to FIG. 10.

As described above, by detecting the press operation or the press-and-hold operation of the touch panel 400, the vibration feedback device 100 generates the main drive signal MDRV based on the trigger signal TRG output from the microcomputer 600, and drives the electromagnetic actuator 300. The main drive signal MDRV that is generated upon detection of the press operation is an example of a first drive signal. The main drive signal MDRV that is generated upon detection of the press operation is an example of a third drive signal.

Then, the vibration feedback device 100 detects the amount of distortion (vibration) of the touch panel 400 according to the main drive signal MDRV, through the distortion detection sensor 500. Then, the vibration feedback device 100 generates the auxiliary drive signal SDRV in response to the detection signal DET indicating the detected amount of distortion, and drives the electromagnetic actuator 300. The auxiliary drive signal SDRV that is generated upon detection of the press operation is an example of a second drive signal. The auxiliary drive signal SDRV that is generated upon detection of the press operation being detected is an example of a fourth drive signal. The auxiliary drive signal SDRV has an amplitude corresponding to an amount of distortion indicated by the detection signal DET, and the auxiliary drive signal SDRV may be generated a plurality of times. In this arrangement, a user that operates the touch panel 400 can be provided with the haptic sensation for each application of the touch panel 400.

(Operational Timing of Controller in FIG. 9)

Figure 10:
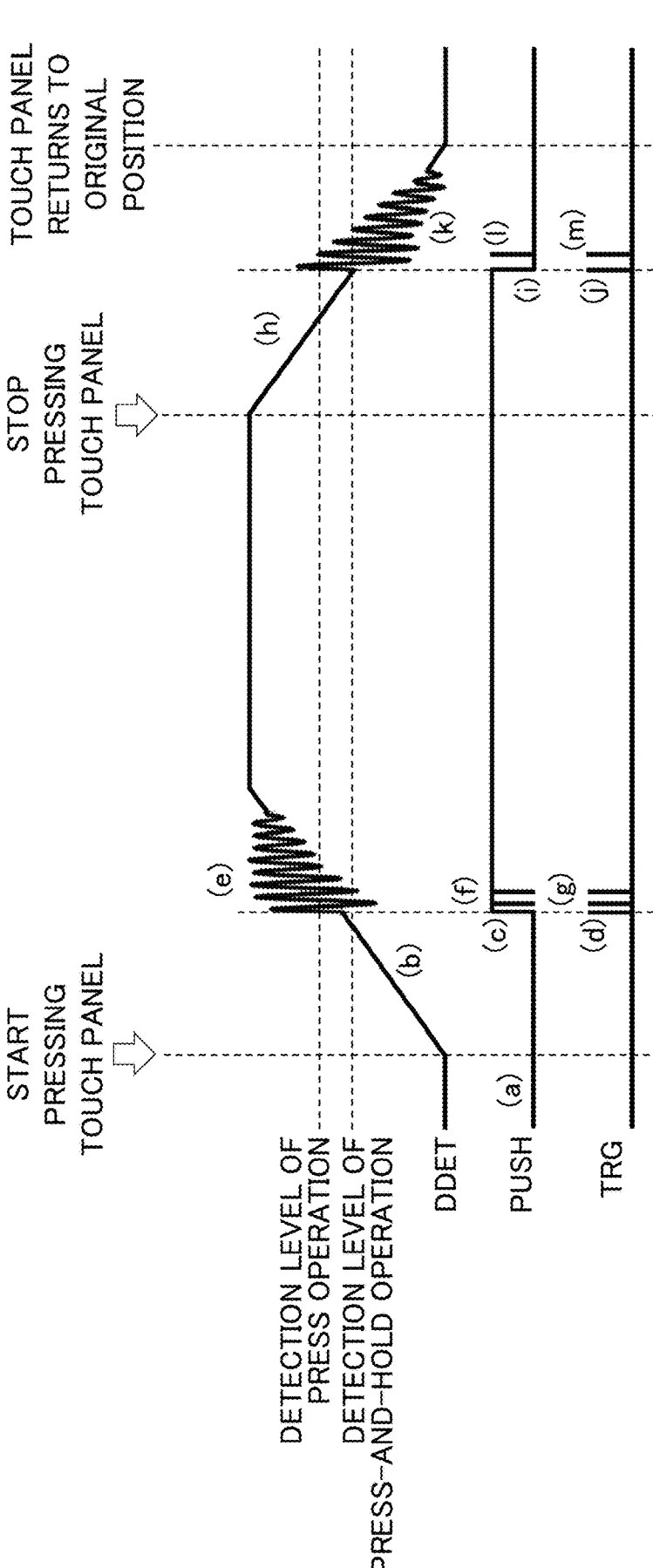
FIG. 10 is a timing diagram showing an example of using a controller of FIG. 9 to detect a press-and-hold operation of a touch panel.

FIG. 10 is a timing diagram showing an example of using the controller 200 of FIG. 9 to detect the press operation and the press-and-hold operation of the touch panel 400. In the example shown in FIG. 10, the press detector 700 detects the press operation of the touch panel 400 when a level of the detection signal DDET received from the distortion detection sensor 500 exceeds a detection level of the press operation. The press detector 700 detects the press-and-hold operation of the touch panel 400 when the level of the detection signal DDET received from the distortion detection sensor 500 falls below the detection level of the press operation. As described above, each of the detection level for the press operation and the detection level for the press-and-hold operation has hysteresis.

Normally, by having the hysteresis, the press detector 700 can suppress the false detection of the press operation even if the detection level for the press operation fluctuates when the detection signal DDET has a slight change less than a hysteresis width. Similarly, the press detector 700 can suppress the false detection of the press operation even if the detection level for the press-and-hold operation fluctuates when the detection signal DDET has a slight change less than the hysteresis width.

However, the controller 200 shown in FIG. 9 drives the electromagnetic actuator 300 in response to receiving the trigger signal TRG, and vibrates the touch panel 400. In this case, as described below, the level of the detection signal DDET output from the distortion detection sensor 500 when the touch panel 400 is pressed may fall below the detection level for the press-and-hold operation, and the level of the detection signal DDET output from the distortion detection sensor 500 when the touch panel 400 is pressed may exceed the detection level for the press operation.

Before the touch panel 400 is pressed, the distortion detection sensor 500 outputs the detection signal DDET that indicates that the touch panel 400 is not displaced, and the press detector 700 outputs the low-level press detection signal PUSH (FIG. 10(*a*)). When the touch panel 400 is pressed by a finger or the like, the level of the detection signal DDET gradually increases (FIG. 10(*b*)). The detection signal DDET is supplied to the analog front end 220 of the controller 200 and the press detector 700.

When the level of the detection signal DDET exceeds the detection level for the press operation, the press detector 700 detects the press operation and changes the press detection signal PUSH to the high level (FIG. 10(*c*)). The microcomputer 600 outputs the trigger signal TRG in response to the rising edge of the press detection signal PUSH (FIG. 10(*d*)). The controller 200 that receives the trigger signal TRG generates the main drive signal MDRV.

The drive unit 270 receives the drive signal DRV corresponding to the main drive signal MDRV, drives the electromagnetic actuator 300, and vibrates the touch panel 400. The vibration of the touch panel 400 is at its largest when the electromagnetic actuator 300 is driven by the drive signal DRV, and then gradually decreases. The distortion detection sensor 500 outputs the detection signal DDET whose amplitude gradually decreases in response to the vibration of the touch panel 400 (FIG. 10(*e*)).

When the level of the detection signal DDET falls below the detection level for the press-and-hold operation due to the vibration of the touch panel 400, the press detector 700 detects the press-and-hold operation and changes the press detection signal PUSH to the low level. Then, when the level of the detection signal DDET again exceeds the detection level for the pressing operation, the press detector 700 detects the press operation and changes the press detection signal PUSH to the high level (FIG. 10(*f*)).

The microcomputer 600 outputs the trigger signal TRG each time the press detection signal PUSH from the press detector 700 changes to the high level (FIG. 10(*g*)). The controller 200 generates the main drive signal MDRV in response to the trigger signal TRG. Since the main drive signal MDRV is generated again after the electromagnetic actuator 300 is driven by the drive signal DRV, the drive unit 270 unintentionally drives the electromagnetic actuator 300 during a time period in which the vibration gradually decreases. For this reason, the vibration when the touch panel 400 is pressed differs from the vibration corresponding to the waveform of an ideal detection signal DDET whose amplitude gradually decreases as shown in FIG. 10. As a result, uncomfortable vibrations are unintentionally transmitted to the user who presses the touch panel 400.

On the other hand, when the pressing of the touch panel 400 with a finger or the like is stopped, the level of the detection signal DDET gradually decreases (FIG. 10(*h*)). When the level of the detection signal DDET falls below the detection level for the press-and-hold operation, the press detector 700 detects the press-and-hold operation and changes the press detection signal PUSH to the low level (FIG. 10(*i*)). The microcomputer 600 outputs the trigger signal TRG in response to the falling edge of the press detection signal PUSH (FIG. 10(*j*)).

With this approach, in the same manner as when the touch panel 400 is pressed, the drive unit 270 receives the drive signal DRV corresponding to the main drive signal MDRV, drives the electromagnetic actuator 300, and vibrates the touch panel 400. The vibration of the touch panel 400 is at its largest when the electromagnetic actuator 300 is driven by the drive signal DRV, and then gradually decreases. The distortion detection sensor 500 outputs the detection signal DDET whose amplitude gradually decreases in response to the vibration of the touch panel 400 (FIG. 10(*k*)).

When the level of the detection signal DDET exceeds the detection level for the press operation due to the vibration of the touch panel 400, the press detector 700 detects the press operation and changes the press detection signal PUSH to the high level. Thereafter, when the level of the detection signal DDET falls below the detection level for the press-and-hold operation again, the press detector 700 detects the press operation and changes the press detection signal PUSH to the low level (FIG. 10(*l*)).

Each time the press detection signal PUSH from the press detector 700 changes to the low level, the microcomputer 600 outputs the trigger signal TRG (FIG. 10(*m*)). As a result, the main drive signal MDRV is generated as in a case of pressing the touch panel 400. Since the main drive signal MDRV is generated again after the electromagnetic actuator 300 is driven by the drive signal DRV, the drive unit 270 unintentionally drives the electromagnetic actuator 300 during a time period in which the vibration gradually decreases. In this arrangement, the vibration when the touch panel 400 is pressed differs from the vibration corresponding to the waveform of an ideal detection signal DDET whose amplitude gradually decreases as shown in FIG. 10. As a result, uncomfortable vibrations are unintentionally transmitted to the user who presses the touch panel 400.

Block Diagram of Vibration Feedback Device According to Third Embodiment

Figure 11:
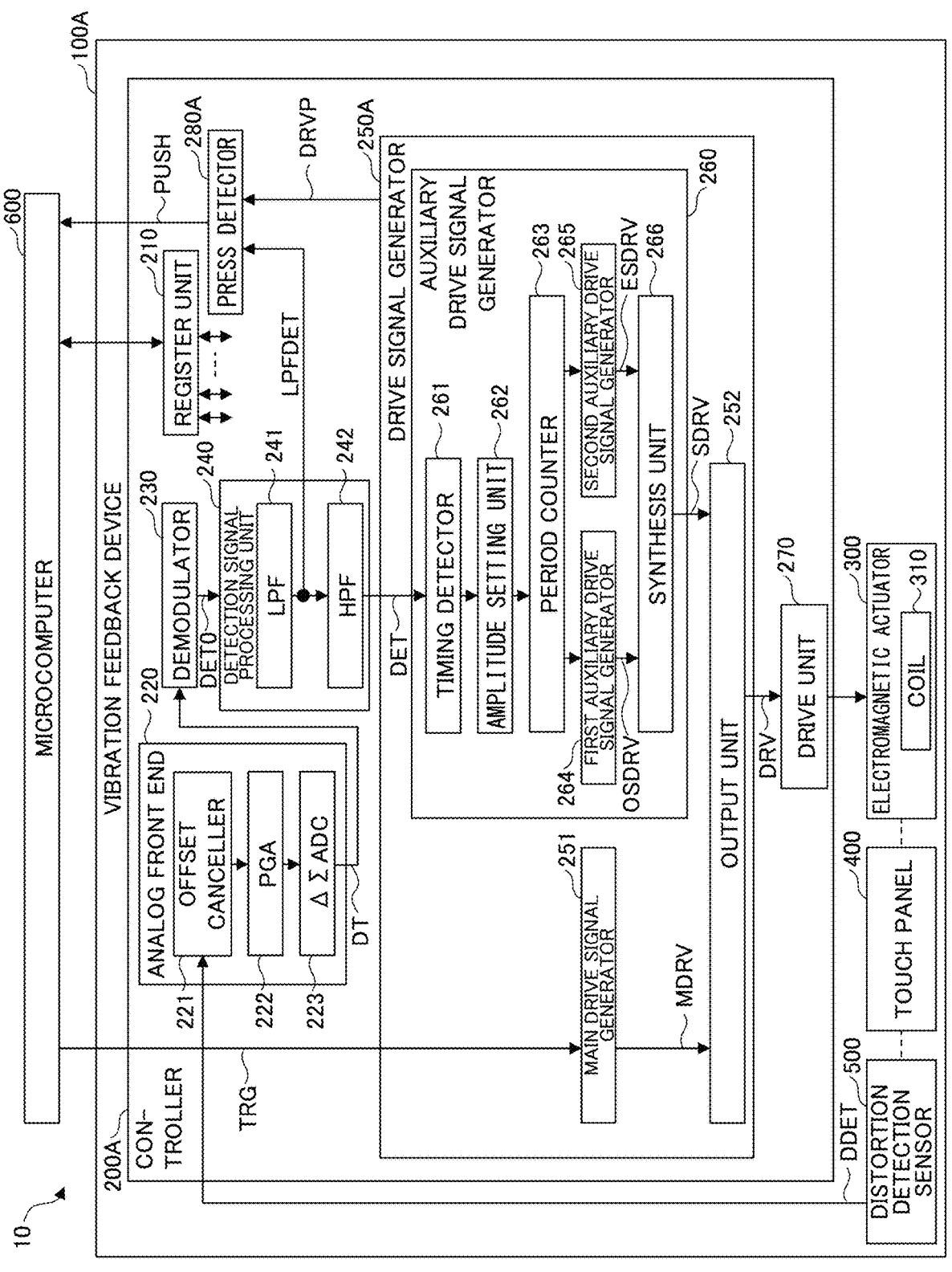
FIG. 11 is a block diagram showing an example of a vibration feedback device having a controller according to a third embodiment.

FIG. 11 is a block diagram showing an example of a vibration feedback device 100A having a controller 200A according to a third embodiment. Components that are similar to those shown in FIG. 9 are denoted by the same numerals, and detailed description of the components is omitted. The appearance and structure of the vibration feedback device 100A shown in FIG. 11 are the same as those of the vibration feedback device 100 shown in FIG. 1. The vibration feedback device 100A may operate by power that is supplied from a battery.

The vibration feedback device 100A shown in FIG. 11 has the same configuration as the vibration feedback device 100 shown in FIG. 9, except that the controller 200A is provided instead of the controller 200 shown in FIG. 9. For example, the controller 200A is manufactured as a semiconductor chip and is mounted on a substrate (not shown) mounted on the vibration feedback device 100A. Although the controller 200A operates in synchronization with a clock signal, the description of the clock signal is omitted.

The controller 200A has the same configuration as that of the controller 200 shown in FIG. 9, except that the controller 200A has a drive signal generator 250A instead of the drive signal generator 250 of the controller 200 shown in FIG. 9, and that the controller 200A further has a press detector 280A. The drive signal generator 250A has the same function as that of the drive signal generator 250 shown in FIG. 9, except that the drive signal generator 250A has a function of generating the drive period signal DRVP.

The press detector 280A outputs the press detection signal PUSH to the microcomputer 600. The microcomputer 600 receives the press detection signal PUSH from the press detector 280A, and thus the system 10 does not have the press detector 700 shown in FIG. 9. The press detector 280A is an example of a press detector.

The press detector 280A receives the detection signal LPFDET from the detection signal processing unit 240, and the drive period signal DRVP from the drive signal generator 250A. The drive signal generator 250 asserts the drive period signal DRVP during a period for generating the drive signal DRV according to the detection signal DET, and negates the drive period signal DRVP when the detection signal DET becomes smaller than a predetermined amplitude. For example, the amplitude of the detection signal DET for determining the negation of the drive signal DRVP may be set in the register unit 210.

When the drive period signal DRVP is asserted, the press detector 280A stops the detection of the press operation by comparing the detection signal LPFDET with the detection level for the press operation, and stops the detection of the stop operation by comparing the detection signal LPFDET with the detection level for the press-and-hold operation. In this arrangement, during a period in which the controller 200A is driving the electromagnetic actuator 300, the change in the press detection signal PUSH due to changes in the detection signals DDET and LPFDET can be suppressed. The operation of the press detector 280A will be described in detail with reference to FIG. 12.

(Operational Timing of Controller Shown in FIG. 11)

Figure 12:
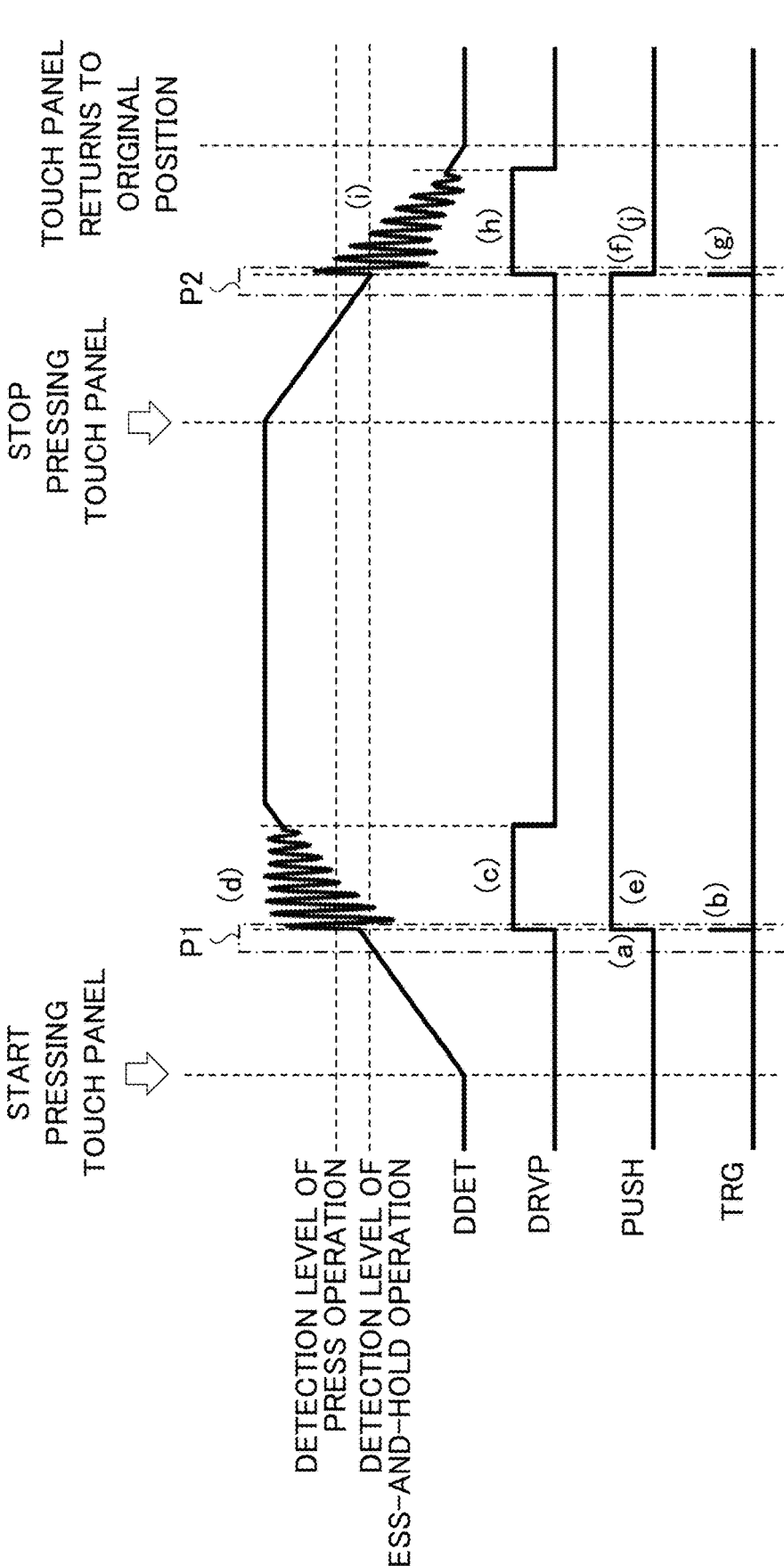
FIG. 12 is a timing diagram showing an example of using a controller of FIG. 11 to detect the press-and-hold operation of the touch panel.
Figure 13:
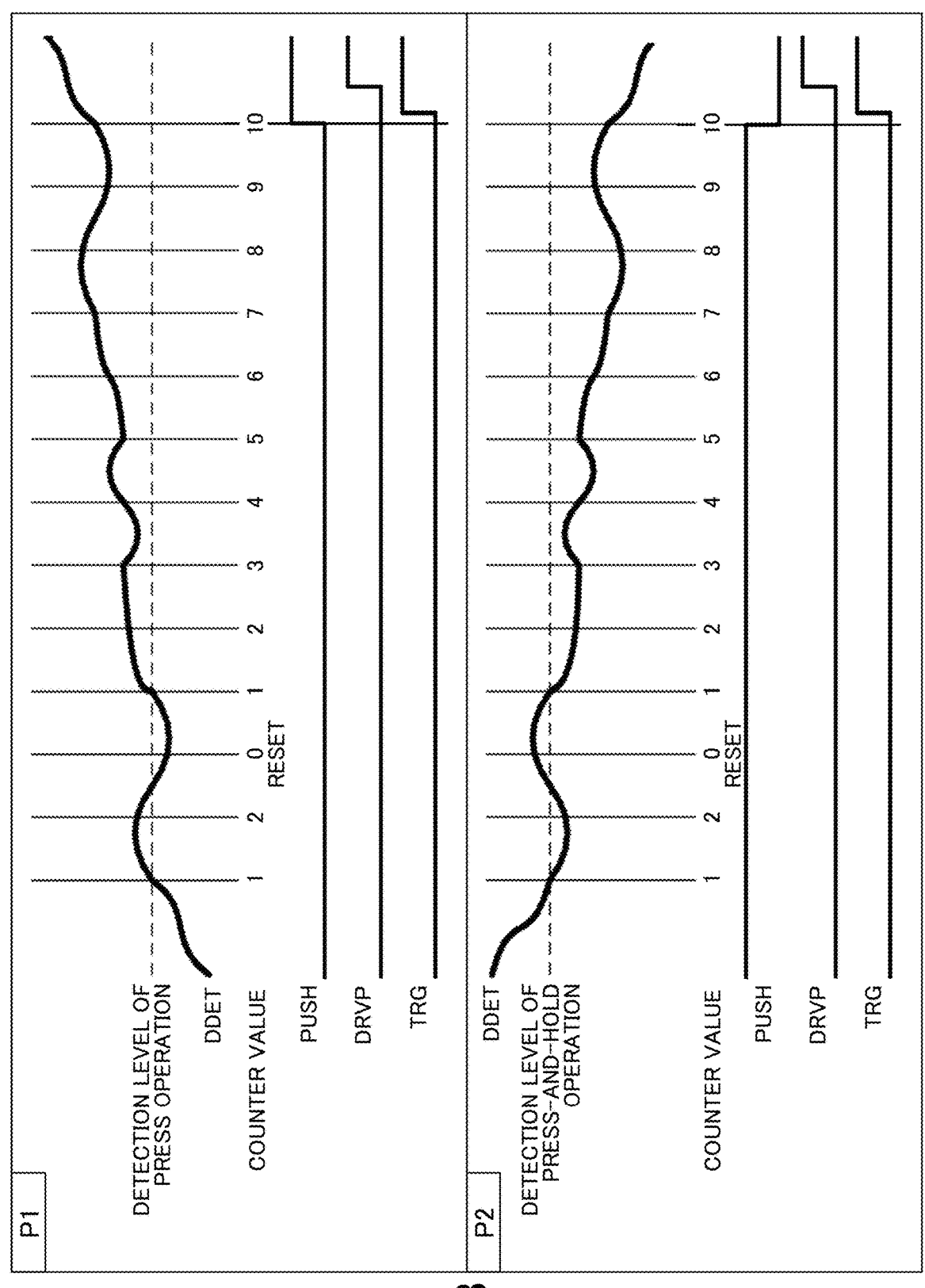
FIG. 13 is a timing diagram showing details of detecting the press-and hold operation of FIG. 12.
Figure 15:
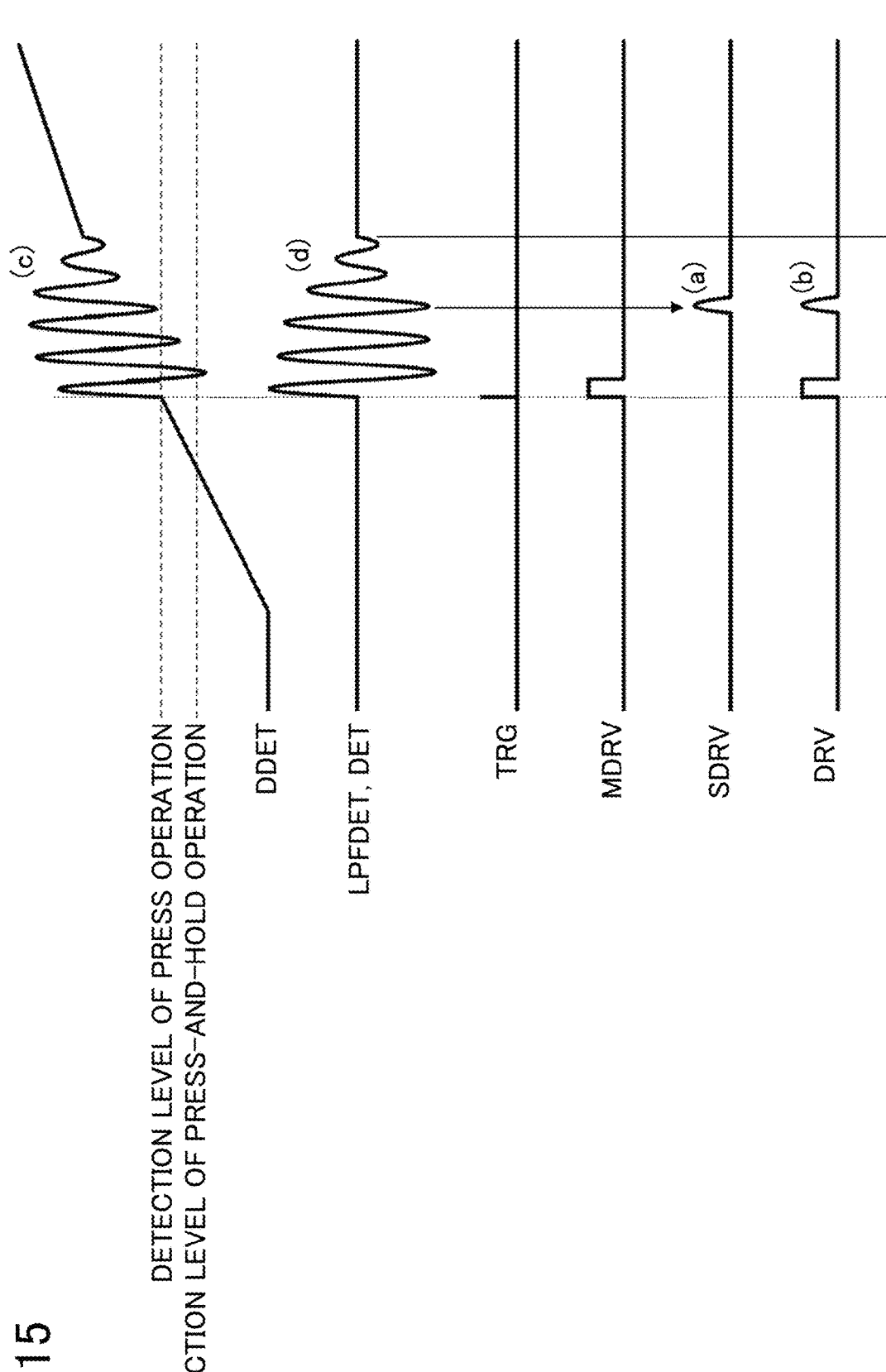
FIG. 15 is a timing diagram showing an example of including a brake operation for suppressing the vibration of the touch panel when the press operation is detected.
Figure 16:
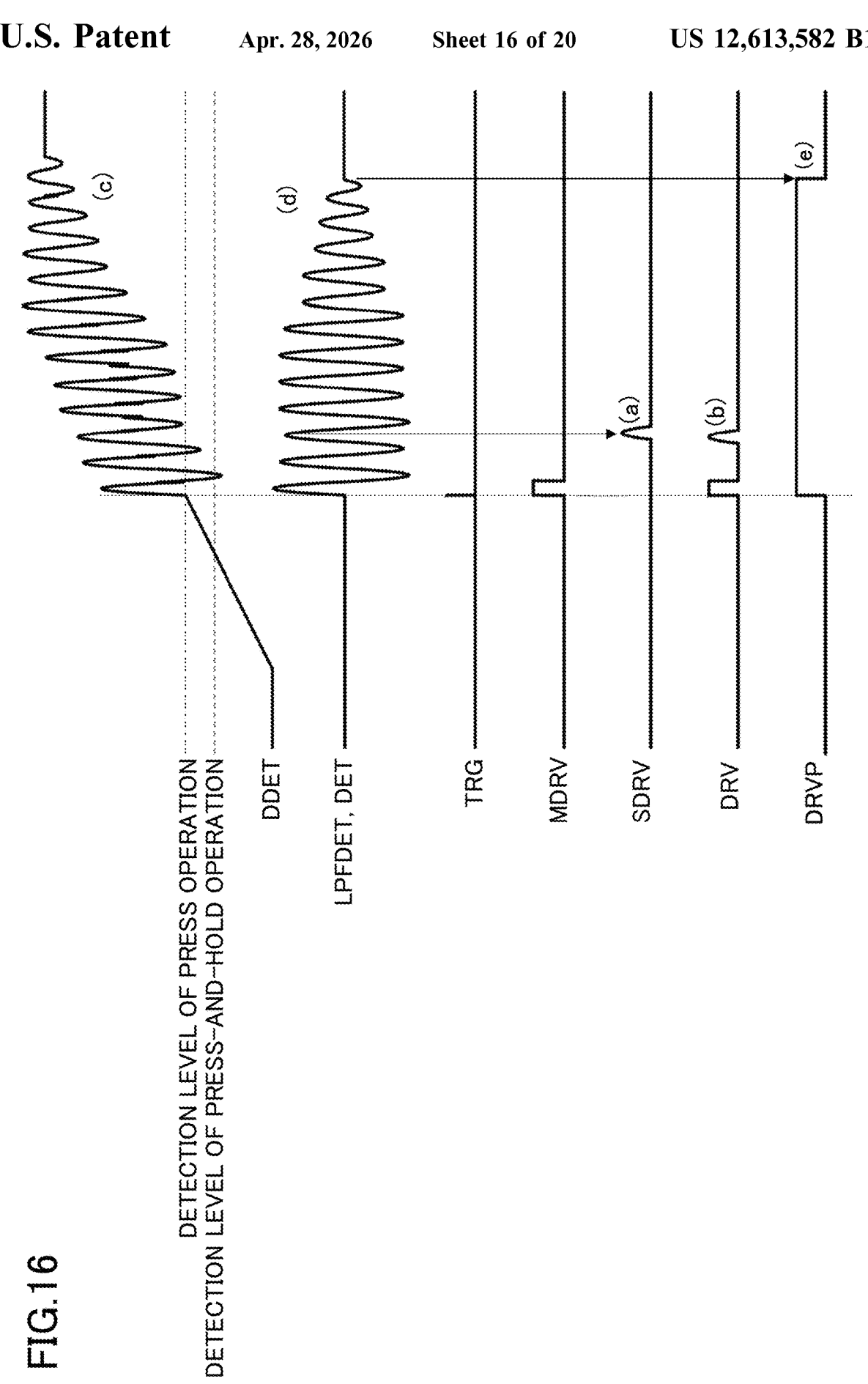
FIG. 16 is a timing diagram showing an example of including an accelerator operation for accelerating the vibration of the touch panel when the press operation is detected.

FIG. 12 is a timing diagram showing an example of using the controller 200A shown in FIG. 11 to detect the press operation and the press-and-hold operation of the touch panel 400. The operation that is similar to that shown in FIG. 10 is not be described in detail. The waveform of the detection signal DDET, the detection level for the press operation, and the detection level for the press-and-hold operation are the same as those shown in FIG. 10. The waveform of each of the detection signals LPFDET and DET that are received by the press detector 280A is the same as that of the detection signal DDET. The waveforms obtained by enlarging periods P1 and P2 shown in FIG. 12 are shown in FIG. 13. FIG. 12 also shows an example in which the electromagnetic actuator 300 is driven only once based on the main drive signal MDRV when each of the press operation and the press-and-hold operation is detected. FIGS. 15 and 16 show examples in which the electromagnetic actuator 300 is driven a plurality of times based on the main drive signal MDRV and the auxiliary drive signal SDRV for brake or accelerator, when the press operation is detected.

The press detector 280A detects the press operation and changes the press detection signal PUSH to a high level (FIG. 12(*a*)), when pressing of the touch panel 400 by a finger or the like is started, and the level of the detection signal DDET (LPFDET) exceeds the detection level for the press operation (FIG. 12(*a*)). The microcomputer 600 outputs the trigger signal TRG in response to the rising edge of the press detection signal PUSH (FIG. 12(b)).

The drive signal generator 250A that receives the trigger signal TRG asserts the drive period signal DRVP to the high level when the drive signal generator 250A starts generating the drive signal DRV, and the drive signal generator 250A negates the drive period signal DRVP to the low level when the detection signal DET (not shown) becomes smaller than a predetermined amplitude (FIG. 12(c)). For example, the drive period signal DRVP is set to the high level in synchronization with the generation of the main drive signal MDRV. The drive period signal DRVP that is set to the high level when the press operation is detected is an example of a first drive period signal.

The drive unit 270 receives the drive signal DRV corresponding to the main drive signal MDRV, and drives the electromagnetic actuator 300 to thereby vibrate the touch panel 400. As in FIG. 10, the distortion detection sensor 500 outputs the detection signal DDET (LPFDET) whose amplitude gradually decreases according to the vibration that gradually decreases in the touch panel 400 (FIG. 12(d)). The detection signal DDET (LPFDET) tends to increase due to the press operation of the touch panel 400.

The press detector 280A stops the detection of the press operation and the detection of the press-and-hold operation that are performed by the detection signal DDET (LPFDET), during a period in which the drive period signal DRVP is high. In this arrangement, even if the level of the detection signal DDET (LPFDET) falls below the detection level for the press-and-hold operation during a period when the electromagnetic actuator 300 is driven, the press detection signal PUSH can be suppressed from changing to the low level (FIG. 12(e)). That is, the controller 200A can suppress false detection of the pressing of the touch panel 400.

After receiving the rising edge of the press detection signal PUSH, the microcomputer 600 does not receive the falling edge of the detection signal PUSH until the pressing of the touch panel 400 is stopped. In this arrangement, even if the level of the detection signal DDET (LPFDET) falls below the detection level for the press-and-hold operation due to the driving of the electromagnetic actuator 300, the microcomputer 600 can suppress an erroneous trigger signal TRG from being output. As a result, the detection signal DDET (LPFDET) when pressing the touch panel 400 can be made to have an ideal waveform, and it is possible to suppress the transmission of uncomfortable vibrations to the user who presses the touch panel 400.

When the pressing of the touch panel 400 by a finger or the like is stopped, and the level of the detection signal DDET (LPFDET) falls below the detection level for the press-and-hold operation, the press detector 280A detects the press-and-hold operation and changes the press detection signal PUSH to the low level (FIG. 12(f)). The microcomputer 600 outputs the trigger signal TRG in response to the falling edge of the press detection signal PUSH (FIG. 12(g)).

The drive signal generator 250A that receives the trigger signal TRG asserts the drive period signal DRVP to the high level when generating the drive signal DRV, and negates the drive period signal DRVP to the low level when the detection signal DET (not shown) becomes smaller than a predetermined amplitude (FIG. 12(h)). For example, the drive period signal DRVP is set to the high level for a predetermined time period in synchronization with the generation of the main drive signal MDRV. The drive signal generator 250A generates the drive signal DRV in response to the main drive signal MDRV that is generated in synchronization with the trigger signal TRG. The vibration of the touch panel 400 is at its largest when the electromagnetic actuator 300 is driven by the drive signal DRV, and then the vibration gradually decreases. The drive period signal DRVP that is set to the high level when the press-and-hold operation is detected is an example of a second drive period signal.

The drive unit 270 receives the drive signal DRV corresponding to the main drive signal MDRV, and drives the electromagnetic actuator 300 to thereby vibrate the touch panel 400. The vibration of the touch panel 400 is at its largest when the electromagnetic actuator 300 is driven by the drive signal DRV, and the vibration then gradually decreases. Then, similarly to FIG. 10, the distortion detection sensor 500 outputs the detection signal DDET whose amplitude gradually decreases according to the vibration of the touch panel 400 (FIG. 12(i)). The detection signal DDET tends to decrease due to the press-and-hold operation of the touch panel 400.

The press detector 280A stops the detection of the press operation and the detection of the press-and-hold operation, by the detection signal DDET (LPFDET), during a period in which the drive period signal DRVP is high. In this arrangement, even when the level of the detection signal DDET (LPFDET) exceeds the detection level for the press operation during a period in which the electromagnetic actuator 300 is driven, the press detection signal PUSH can be suppressed from changing to the high level (FIG. 12(j)). That is, the controller 200A can suppress false detection during the press-and-hold operation of the touch panel 400.

(Details of Detecting Press Operation and Press-and-Hold Operation)

FIG. 13 is a timing diagram showing the details of the detection of the press operation and the press-and-hold operation in FIG. 12. In the period P1, when the level of the detection signal DDET (LPFDET) continuously exceeds the detection level for the press operation for 10 cycles, the press detector 280A detects the press operation and sets the press detection signal PUSH to the high level. For example, the number of cycles is counted by a counter that is provided in the press detector 280A. The press detector 280A resets a counter value to "zero" when the level of the detection signal DDET (LPFDET) falls to or below the detection level for the press operation before 10 cycles have elapsed since the level of the detection signal DDET (LPFDET) exceeds the detection level for the press operation. A 10-cycle period for determining the detection of the press operation is an example of a first period.

By detecting the press operation only when a period in which the detection signal DDET (LPFDET) exceeds the detection level for the press operation is greater than or equal to a predetermined period, and by setting the press detection signal PUSH to the high level, for example, when the detection signal DDET (LPFDET) exceeds the detection level for the press operation due to noise or the like, the press detection signal PUSH can be suppressed from changing to the high level. As a result, false detection of the pressing of the touch panel 400 due to noise or the like can be suppressed, and it is possible to suppress the transmission of uncomfortable vibrations to the user who presses the touch panel 400.

In the period P2, when the level of the detection signal DDET (LPFDET) continuously falls below the detection level for the press-and-hold operation for 10 cycles, the press detector 280A detects the press-and-hold operation and sets the press detection signal PUSH to the low level. The press detector 280A resets the counter value to "zero" when the level of the detection signal DDET (LPFDET) becomes greater than or equal to the detection level for the press operation before the 10 cycles have elapsed since the level of the detection signal DDET (LPFDET) fell below the detection level for the press-and-hold operation. A 10-cycle period for determining the detection of the press-and-hold operation is an example of a second period.

By detecting the press-and-hold operation only when a period in which the detection signal DDET (LPFDET) falls below the detection level for the press operation is greater than or equal to a predetermined period, and by setting the press detection signal PUSH to the low level, for example, when the detection signal DDET (LPFDET) falls below the detection level for the press-and-hold operation due to noise or the like, the press detection signal PUSH can be suppressed from changing to the low level. As a result, the false detection in pressing the touch panel 400, due to noise or the like can be suppressed, and it is possible to suppress the transmission of uncomfortable vibrations to the user who stops pressing the touch panel 400.

(Details of Detecting Press Operation in FIG. 12)

Figure 14:
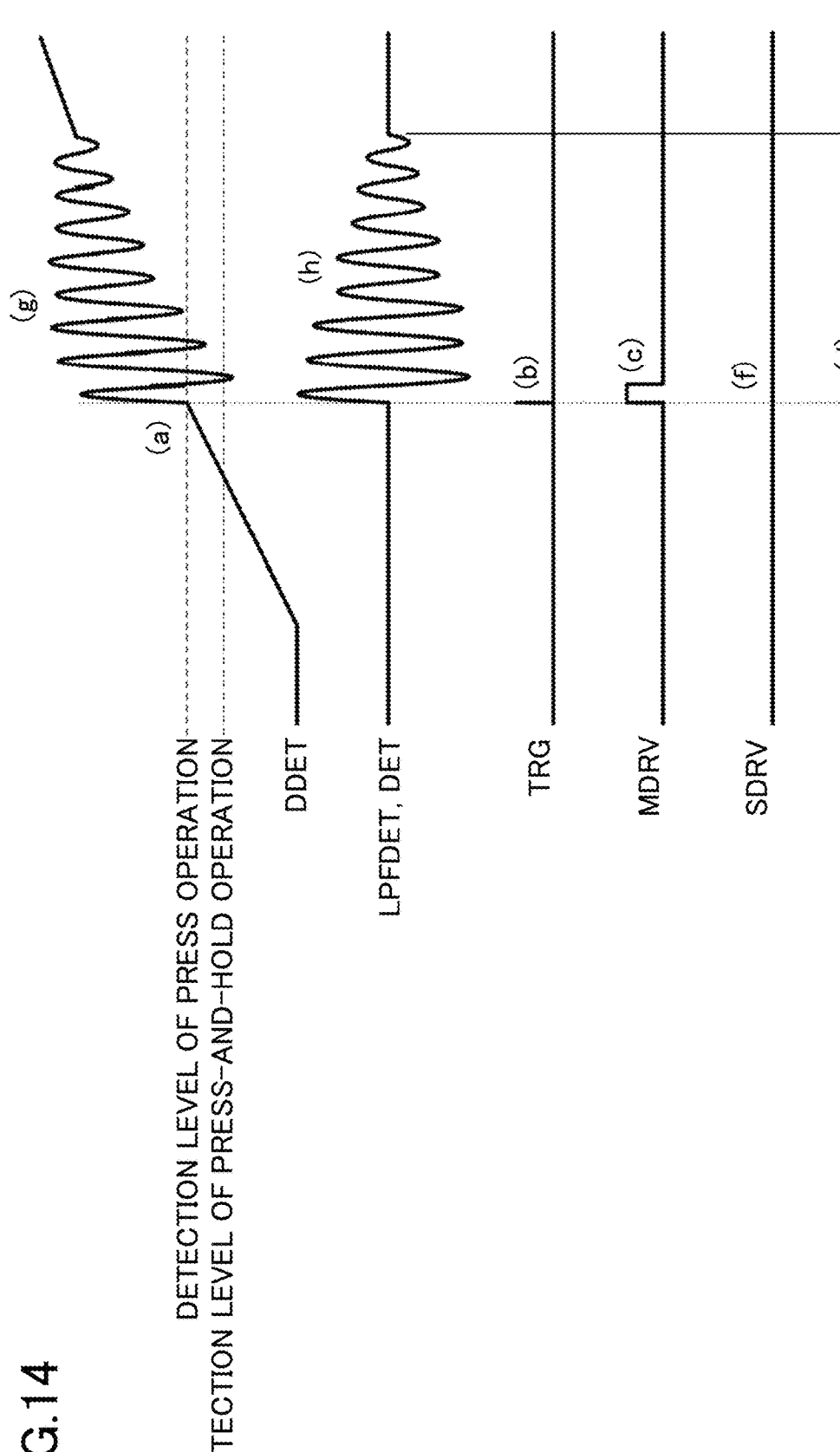
FIG. 14 is a timing diagram showing details of the detection of the press operation shown in FIG. 12.

FIG. 14 is a timing diagram showing details of detecting the press operation in FIG. 12. Detailed description of the same operation as in FIG. 12 is omitted. The detailed operation when detecting the press operation is the same as in FIG. 14.

When the detection signal LPFDET exceeds the detection level for the press operation while the drive period signal DRVP is negated, the trigger signal TRG is output from the microcomputer 600 (FIGS. 14(*a*) and (*b*)). The drive signal generator 250A generates the main drive signal MDRV and the drive signal DRV based on the trigger signal TRG, and asserts the drive period signal DRVP (FIG. 14(*c*), (*d*), and (*e*)). If a brake operation or an accelerator operation is not included in the detection of the press operation, the auxiliary drive signal SDRV is not generated (FIG. 14(*f*)).

The drive unit 270 receives the drive signal DRV, drives the electromagnetic actuator 300, and vibrates the touch panel 400. The distortion detection sensor 500 outputs the detection signal DDET whose amplitude gradually decreases in response to the vibration that gradually decreases in the touch panel 400 (FIG. 14(*g*)). The detection signal processing unit 240 generates detection signals LPF-DET and DET each of which the amplitude gradually decreases, based on the detection signal DETO that is generated by the demodulator 230 corresponding to the detection signal DDET (FIG. 14(*h*)). The drive signal generator 250 negates the drive period signal DRVP when the amplitude of the detection signal DET becomes smaller than a preset threshold (FIG. 14(*i*)).

(Brake Operation in Detection of Press Operation in FIG. 12)

FIG. 15 is a timing diagram showing an example in which the brake operation for suppressing vibration of the touch panel 400 is included in the detection of the press operation. Detailed description of the same operation as in FIGS. 12 and 14 is omitted. The operation from the output of the trigger signal TRG from the microcomputer 600 until the generation of the drive signal DRV is the same as in FIG. 14. The brake operation in the detection of the press operation is the same as in FIG. 15.

In FIG. 15, as an example, the auxiliary drive signal generator 260 outputs the auxiliary drive signal SDRV at the third bottom of the amplitude of the detection signal DET (FIG. 15(*a*)). The output unit 252 of the drive signal generator 250A outputs the drive signal DRV to the drive unit 270 in response to the auxiliary drive signal SDRV (FIG. 15(*b*)). The drive unit 270 then drives the electromagnetic actuator 300 to vibrate the touch panel 400. In this case, by outputting the auxiliary drive signal SDRV at an amplitude bottom of the detection signal, the vibration of the touch panel 400 is braked and the signal converges more quickly. As a result, respective periods in which the detection signals DDET, LPFDET, and DET have amplitudes become shorter than those in FIG. 14 (FIGS. 15(*c*) and (*d*)). In addition, an assertion period of the drive period signal DRVP becomes shorter than that in FIG. 14 (FIG. 15(*e*)).

(Accelerator Operation in Detection of Press-and-Hold Operation in FIG. 12)

FIG. 16 is a timing diagram showing an example in which the accelerator operation for accelerating the vibration of the touch panel 400 is included in the detection of the press operation. The same operation as in FIGS. 12 and 14 is not described in detail. The operation from the output of the trigger signal TRG from the microcomputer 600 until the generation of the drive signal DRV is the same as in FIG. 14. The accelerator operation in the detection of the press-and-hold operation is the same as in FIG. 16.

In the example shown in FIG. 16, the auxiliary drive signal generator 260 outputs the auxiliary drive signal SDRV at the third peak of the amplitude of the detection signal DET (FIG. 16(*a*)). The output unit 252 of the drive signal generator 250A outputs the drive signal DRV to the drive unit 270 in response to the auxiliary drive signal SDRV (FIG. 16(*b*)). Then, the drive unit 270 drives the electromagnetic actuator 300 to vibrate the touch panel 400. In this case, by outputting the auxiliary drive signal SDRV at the peak amplitude of the detection signal DET, the vibration of the touch panel 400 is accelerated and the vibration is difficult to converge. As a result, respective periods in which the detection signals DDET, LPFDET, and DET have amplitudes become longer than those in FIG. 14 (FIGS. 16(*c*) and (*d*)). The assertion period of the drive period signal DRVP becomes longer than that in FIG. 14 (FIG. 16(*e*)).

As described above, in the present embodiment, the press detector 280A stops the detection of the press operation and the detection of the press-and-hold operation, by the detection signal DDET during a period in which the drive period signal DRVP is high. In this arrangement, even if the level of the detection signal DDET falls below the detection level for the press-and-hold operation during a period in which the electromagnetic actuator 300 is driven, the press detection signal PUSH can be suppressed from changing to the low level.

Similarly, when the level of the detection signal DDET exceeds the detection level for the press-and-hold operation, the press detection signal PUSH can be suppressed from changing to the high level. In this arrangement, the controller 200A can suppress false detection of the press-and-hold operation of the touch panel 400. As a result, it is possible to suppress the transmission of uncomfortable vibrations to the user who presses or releases the touch panel 400.

By detecting the press operation only when the period in which the detection signal DDET exceeds the detection level of the press operation is greater than or equal to a predetermined period, and by setting the press detection signal PUSH to the high level, for example, when the detection signal DDET exceeds the detection level of the press operation due to noise or the like, the press detection signal PUSH can be suppressed from changing to the high level.

Similarly, by detecting the press-and-hold operation only when a period in which the detection signal DDET falls below the detection level for the press-and-hold operation is greater than or equal to a predetermined time period, and by setting the press detection signal PUSH to the low level, for example, when the detection signal DDET falls below the detection level for the press-and-hold operation due to noise or the like, the press detection signal PUSH can be suppressed from changing to the low level. As a result, false detection of pressing, or the press-and-hold operation of the touch panel 400 due to noise or the like can be suppressed, and it is possible to suppress the transmission of uncomfortable vibrations to the user who presses or releases the touch panel 400.

By providing the press detector 280A in the controller 200A that is manufactured as a semiconductor chip, it is not necessary to provide, for example, the press detector 700 as a single component outside the vibration feedback device 100A. In this arrangement, it is possible to suppress an increase in the size of the substrate on which the microcomputer 600 is mounted, to thereby suppress an increase in the cost of the system 10.

Fourth Embodiment

In a vibration feedback device that includes a type of haptic interface in the related art, a vibrational behavior of an operation device may differ, even when the same drive pulse signal is applied to an actuator due to variations in natural frequencies of the operation device such as a touch panel, and an actuator. Due to the variations in the natural frequencies, for example, vibrations may be attenuated even when the drive pulse signal for continuous vibration is generated, or vibrations may be continuously maintained even when generating the drive pulse signal that attenuates the vibration. For this reason, prior to shipping the vibration feedback device, the controller that is mounted on the vibration feedback device acquires vibration data by applying various drive pulse signals to the actuator, and learning is performed to tune an appropriate drive pulse signal according to the variations in the natural frequencies.

For example, in the learning, the controller generates the drive pulse signal to vibrate the operation device, and the acquired vibration data is transferred to a computer that is connected to the vibration feedback device. The computer analyzes the transferred vibration data to tune the appropriate drive signal pulse.

However, if, for example, a frequency at which the vibration data is acquired by the controller is higher than a frequency at which the vibration data is received by the computer, the vibration data that is used for analysis by the computer is lost, and it may be difficult to tune the appropriate drive signal pulse. For example, loss of the vibration data occurs when the communication speed of a communication interface that connects the vibration feedback device and the computer is low, or when the speed at which the vibration data is analyzed by the computer is low.

In the disclosed technique related with the controller that is mounted on the vibration feedback device that vibrates an operation device based on detection of contact with the operation device, an object of the technique is to transfer vibration data that is periodically generated to a computer without loss.

(Block Diagram of Vibration Feedback Device)

Figure 17:
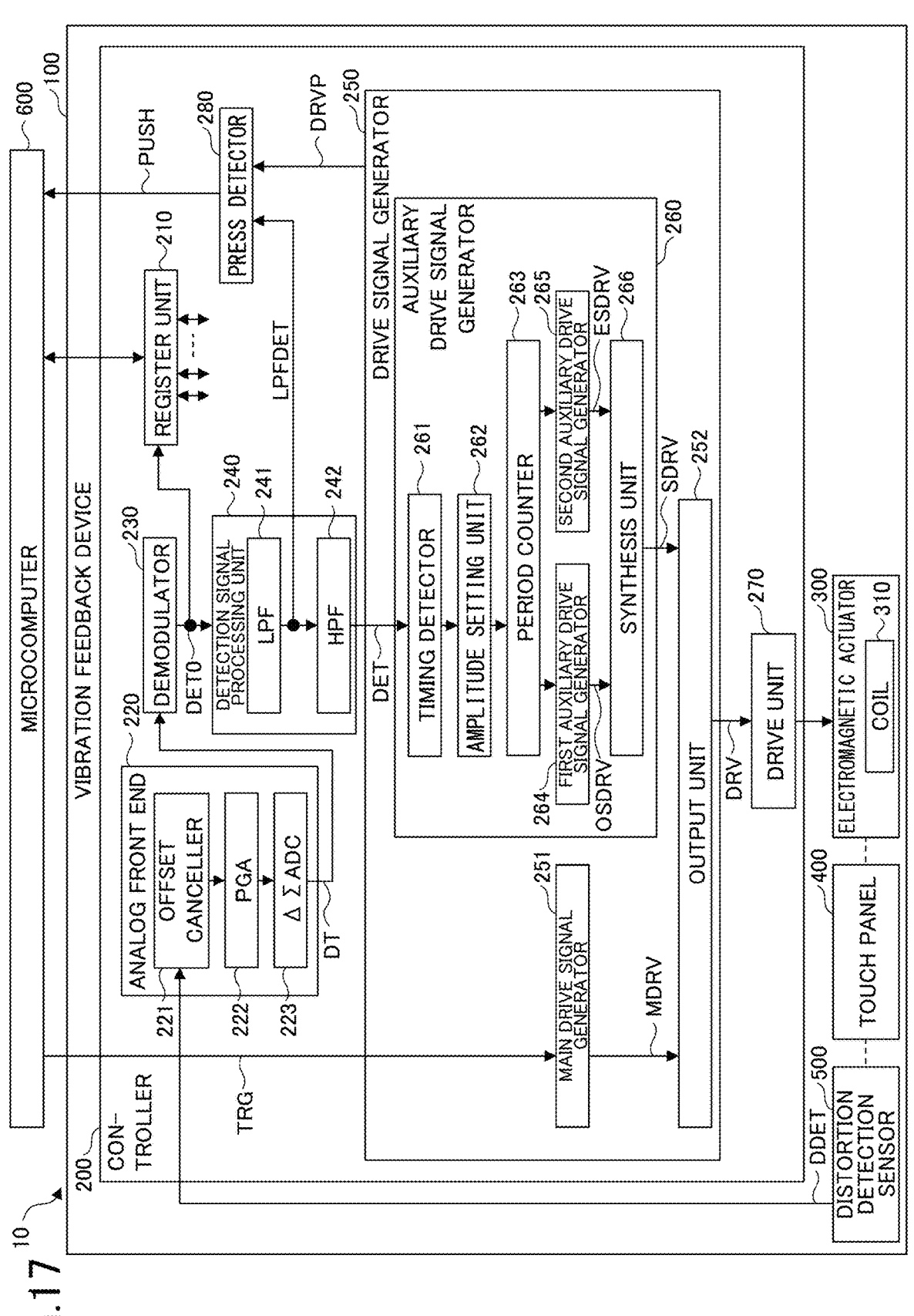
FIG. 17 is a block diagram showing an example of the vibration feedback device of FIG. 1.

FIG. 17 is a block diagram showing an example of the vibration feedback device 100 shown in FIG. 1. FIG. 17 shows the configuration of a system 10 on which the vibration feedback device 100 is mounted. The system 10 includes the vibration feedback device 100 and a microcomputer 600. The microcomputer 600 is an example of an external device disposed outside the vibration feedback device 100. For example, the microcomputer 600 may be mounted on a system board that is provided in the system 10.

The vibration feedback device 100 shown in FIG. 17 has been proposed by the inventor of this application, and is not publicly known. A problem of the vibration feedback device 100 will be described below with reference to FIG. 18.

The vibration feedback device 100 has a controller 200, an electromagnetic actuator 300 including a coil 310, a touch panel 400, and a distortion detection sensor 500. The distortion detection sensor 500 that is supported on the movable plate 104 of FIG. 1, together with the touch panel 400, detects the displacement of the touch panel 400 in response to pressing or releasing the touch panel 400, or vibration caused by the electromagnetic actuator 300.

The controller 200 has a register unit 210, an analog front end 220, a demodulator 230, a detection signal processing unit 240, a drive signal generator 250, a drive unit 270, and a press detector 280. The analog front end 220 has an offset canceller 221, a programmable gain amplifier (PGA) 222, and a delta-sigma ADC (Analog-to-Digital Converter) 223. The detection signal processing unit 240 has a low-pass filter (LPF) 241 and a high-pass filter (HPF) 242.

The drive signal generator 250 has a main drive signal generator 251, an auxiliary drive signal generator 260, and an output unit 252. The auxiliary drive signal generator 260 includes a timing detector 261, an amplitude setting unit 262, a period counter 263, a first auxiliary drive signal generator 264, a second auxiliary drive signal generator 265, and a synthesis unit 266. The controller 200 operates in synchronization with a clock signal that is a system clock of the vibration feedback device 100. Description of the clock signal is omitted.

The register unit 210 includes a plurality of registers that are read from and written to using the microcomputer 600. For example, one of the plurality of registers is used to hold vibration data indicated by the detection signal DETO that is output from the demodulator 230. Although not particularly limited, the microcomputer 600 can access the register unit 210 through, for example, an inter-integrated circuit (I2C) interface. A state of the controller 200 may be set by various control signals that are output from registers according to setting values of the register unit 210 that are written to using the microcomputer 600.

In the analog front end 220, the offset canceller 221 cancels an offset of the detection signal DDET (analog signal) indicating an amount of distortion that is detected by the distortion detection sensor 500, and outputs a result to the programmable gain amplifier 222. The programmable gain amplifier 222 amplifies the detection signal DDET whose offset has been canceled. The delta-sigma ADC generates a serial data signal DT according to a change in the voltage of the amplified detection signal DDET, and outputs the generated serial data signal DT to the demodulator 230.

The demodulator 230 sequentially demodulates the serial data signal DT that is received from the delta-sigma ADC while shifting bit positions, to thereby generate a plurality of detection signals DETO indicating respective amounts of distortion of the touch panel 400. The demodulator 230 sequentially outputs the generated detection signals DETO to the detection signal processor 240. That is, the demodulator 230 periodically converts the detection signal DDET that is output from the distortion detection sensor 500, into a digital detection signal DETO. In addition, the demodulator 230 sequentially stores the generated detection signals DETO in predetermined registers of the register unit 210 during learning of the vibration feedback device 100. Hereinafter, the detection signal DETO is also referred to as vibration data.

In the learning of the vibration feedback device 100, for example, the microcomputer 600 executes a tuning program to control the controller 200. Then, the microcomputer 600 tunes the drive signal DRV for driving the electromagnetic actuator 300, based on the vibration data VDT that is obtained when a specific plurality of vibrations are applied to the touch panel 400. Information or the like on the amplitude of the drive signal DRV that is determined by performing tuning is stored, for example, in a data table or the like that is used by the amplitude setting unit 262.

A learning process can suppress the vibrational behavior of the touch panel 400 across different vibration feedback devices 100 due to variations in the natural frequencies of the touch panel 400 and the electromagnetic actuator 300. As a result, even when there are variations in the natural frequencies of the touch panel 400 and the electromagnetic actuator 300, it is possible to suppress the transmission of uncomfortable vibrations to the user who presses the touch panel 400. Instead of connecting the vibration feedback device 100 to the microcomputer 600, the learning process may be performed by connecting the vibration feedback device to a learning evaluation device.

The low-pass filter 241 of the detection signal processing unit 240 performs noise removal processing of the detection signal DETO that is received from the demodulator 230, and then the low-pass filter 241 outputs the detected signal LPFDET to the high-pass filter 242 and the press detector 280. The high-pass filter 242 performs offset removal processing of the detected signal LPFDET from which the noise received from the low-pass filter 241 has been removed, and then the high-pass filter 242 outputs the detected signal DET to the auxiliary drive signal generator 260.

The main drive signal generator 251 of the drive signal generator 250 generates the main drive signal MDRV in response to the trigger signal TRG that is received from the microcomputer 600, and outputs the generated main drive signal MDRV to the output unit 252. Although not particularly limited, for example, the main drive signal MDRV may be a square wave. The trigger signal TRG is an example of a drive startup signal.

The timing detector 261 of the auxiliary drive signal generator 260 detects a peak timing and a bottom timing of the waveform of the detection signal DET from the detection signal processing unit 240, or a set of the peak timing, the bottom timing, and a zero-cross timing, and outputs the detected signal to the amplitude setting unit 262 as a timing signal. The timing signal is also output to the period counter 263.

The amplitude setting unit 262 sets the amplitude of the auxiliary drive signal based on the timing signal from the timing detector 261, and outputs amplitude information indicating the set amplitude to the period counter 263. The amplitude setting unit 262 may, for example, set the amplitude of the auxiliary drive signal by referring to a data table stored in a storage unit of the controller 200 and by using information indicated by the timing signal from the timing detector 261.

The period counter 263 counts a period of the auxiliary drive signal SDRV based on the timing signal from the timing detector 261. Then, for example, the period counter 263 instructs the first auxiliary drive signal generator 264 to generate the auxiliary drive signal SDRV during odd-numbered periods, and instructs the second auxiliary drive signal generator 265 to generate the auxiliary drive signal SDRV during even-numbered periods.

For example, the first auxiliary drive signal generator 264 and the second auxiliary drive signal generator 265 are sine wave generators. Based on the instruction from the period counter 263, the first auxiliary drive signal generator 264 generates the auxiliary drive signal SDRV of one period of the sine wave, and outputs the result to the synthesizer 266. Based on the instruction from the period counter 263, the second auxiliary drive signal generator 265 generates the auxiliary drive signal SDRV of one period of the sine wave, and outputs the result to the synthesizer 266. In this arrangement, the auxiliary drive signal SDRV can be suppressed from being interrupted or changing rapidly at a transition point between periods of the auxiliary drive signal SDRV, and the auxiliary drive signal SDRV that changes smoothly can be generated. The first auxiliary drive signal generator 264 and the second auxiliary drive signal generator 265 may be cosine wave generators.

The synthesis unit 266 synthesizes the auxiliary drive signal OSDRV of the odd-numbered periods generated by the first auxiliary drive signal generator 264, and the auxiliary drive signal ESDRV of the even-numbered periods generated by the second auxiliary drive signal generator 265, and outputs a result to the output unit 252 as a waveform sequence of the auxiliary drive signal SDRV. The output unit 252 outputs either the main drive signal MDRV from the main drive signal generator 251 or the auxiliary drive signal SDRV from the auxiliary drive signal generator 260 to the drive unit 270 as the drive signal DRV.

The drive signal generator 250 asserts the drive period signal DRVP when starting the generation of the drive signal DRV, and negates the drive period signal DRVP when the detection signal DET becomes smaller than a predetermined amplitude. For example, the amplitude of the detection signal DET for determining the negation of the drive signal DRVP may be set in the register unit 210. The drive period signal DRVP is output to the press detector 280. The generation of the drive period signal DRVP can suppress the press detector 280 from detecting the press operation during vibration of the touch panel 400 that is caused by driving the electromagnetic actuator 300, as will be described later.

The drive unit 270 drives the electromagnetic actuator 300 in response to the drive signal DRV from the output unit 252. While the electromagnetic actuator 300 is driven, the touch panel 400 moves toward the electromagnetic actuator 300 together with the distortion detection sensor 500, in response to a magnetic force that is generated using the coil 310 that is mounted on the electromagnetic actuator 300.

The press detector 280 detects the vibration of the touch panel 400 based on the detection signal DDET indicating an amount of distortion detected by the distortion detection sensor 500. When the press operation of the touch panel 400 is detected based on the detected vibration, the press detector 280 outputs the press signal PUSH to the microcomputer 600. For example, when the drive period signal DRVP is asserted, the press detector 280 stops detecting the press operation of the touch panel 400 that is performed based on the detection signal LPFDET. When the drive period signal DRVP is negated, the press detector 280 detects the press operation of the touch panel 400 based on the detection signal LPFDET from the detection signal processing unit 240. Here, the press operation is detected based on the fact that the touch panel 400 is pressed by a user's finger or the like. For example, when the press operation is detected, the press detector 280 may generate a pulse signal by temporarily asserting the press detection signal PUSH.

The microcomputer 600 outputs the trigger signal TRG to the vibration feedback device 100 in response to the assertion of the press detection signal PUSH. The press detection signal PUSH may be communicated to the microcomputer 600 as an interrupt signal.

In this arrangement, the vibration feedback device 100 generates the main drive signal MDRV based on the trigger signal TRG that is output from the microcomputer 600 in response to detection of the press operation on the touch panel 400, and drives the electromagnetic actuator 300. Then, the vibration feedback device 100 detects an amount of distortion (vibration) in the touch panel 400 according to the main drive signal MDRV, by using the distortion detection sensor 500.

Then, the vibration feedback device 100 generates the auxiliary drive signal SDRV in response to the detection signal DET indicating the detected amount of distortion, and drives the electromagnetic actuator 300. The auxiliary drive signal SDRV has an amplitude corresponding to the amount of distortion indicated by the detection signal DET, and may be generated a plurality of times. In this arrangement, the user who operates the touch panel 400 can be provided with a haptic sensation for each application of the touch panel 400.

(Transfer of Vibration Data from Controller to Microcomputer)

Figure 18:
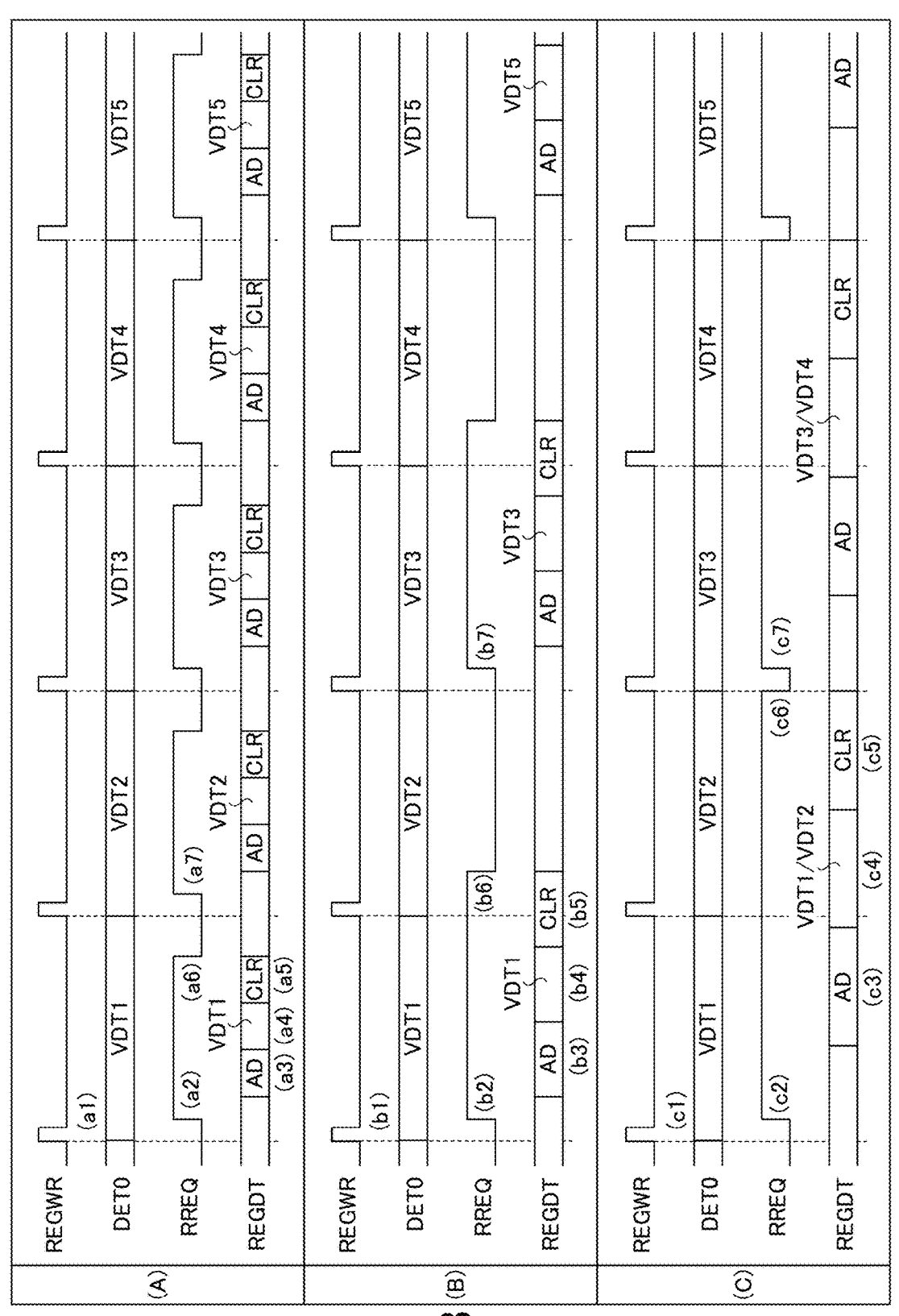
FIG. 18 is a timing diagram showing an example of transferring vibration data from the controller of FIG. 17 to the microcomputer.

FIG. 18 is a timing diagram showing an example of transferring vibration data VDT from the controller 200 to the microcomputer 600 of FIG. 17. FIG. 18(A) shows an example of a case where a frequency at which the microcomputer 600 reads the vibration data VDT from the register unit 210 is similar to a frequency at which the demodulator 230 stores the vibration data VDT in the register unit 210. FIG. 18(B) shows an example of a case where the frequency with which the microcomputer 600 reads the vibration data VDT from the register unit 210 is lower than the frequency at which the demodulator 230 stores the vibration data VDT in the register unit 210. FIG. 18(C) shows an example in which the frequency at which the microcomputer 600 reads the vibration data VDT from the register unit 210 is even lower than the frequency at which the demodulator 230 stores the vibration data VDT in the register unit 210.

The frequency at which the microcomputer 600 reads the vibration data VDT from the register unit 210 is reduced, for example, when the communication speed of the communication interface (in this example, the I2C interface) that connects the vibration feedback device 100 and the microcomputer 600 is low. The frequency at which the microcomputer 600 reads the vibration data VDT from the register unit 210 is also reduced, for example, when the analysis speed of the vibration data VDT by the microcomputer 600 is low.

In FIG. 18, the write signal REGWR is output from the demodulator 230 to the register unit 210. The vibration data VDT (each of VDT1, VDT2, VDT3, VDT4, and VDT5) indicates a signal value indicated by the detection signal DETO. A read request RREQ is output from the demodulator 230 to the microcomputer 600. A data line REGDT is connected between the register unit 210 and the microcomputer 600 and is used to transfer information.

In each of FIG. 18(A) to (C), the demodulator 230 outputs a write signal REGWR to the register unit 210, together with the vibration data VDT that is stored in the register unit 210 (FIG. 18(a1), (b1), and (c1)). After storing the vibration data VDT in the register unit 210 in synchronization with the write signal REGWR, the demodulator 230 asserts the read requests RREQ to the microcomputer 600 via a register of the register unit 210 (FIGS. 18(a2), (b2), and (c2)).

In response to the assertion of the read request RREQ, the microcomputer 600 outputs an address AD of the register unit 210 in which the vibration data VDT is stored, to the register unit 210 via the data line REGDT (FIGS. 18(a3), (b3), and (c3)). Then, the microcomputer 600 reads the vibration data VDT that is held in the register unit 210, via the data line REGDT (FIGS. 18(a4), (b4), and (c4)).

After reading the vibration data VDT from the register unit 210, the microcomputer 600 outputs a clear notification CLR indicating the completion of reading the vibration data VDT, to the register unit 210 via the data line REGDT (FIGS. 18(a5), (b5), and (c5)). The register unit 210 negates the read request REQ in response to receiving the clear notification CLR (FIGS. 18(a6), (b6), and (c6)). After this, the register unit 210 outputs the read request RREQ to the microcomputer 600 in response to new vibration data VDT that is stored in the register in synchronization with the write signal REGWR (FIGS. 18(a7), (b7), and (c7)).

In FIG. 18(A), the microcomputer 600 can read the vibration data VDT each time the vibration data VDT is output from the demodulator 230, and the learning (tuning of the drive signal DRV) of the vibration feedback device 100 can be performed normally.

In FIG. 18(B), before the clear notification CLR for the vibration data VDT1 reaches the register unit 210, the demodulator 230 stores the subsequent vibration data VDT2 in the register unit 210. In this arrangement, the register unit 210 cannot assert the read request RREQ of the vibration data VDT2 corresponding to the write signal REGWR, and the microcomputer 600 cannot read the vibration data VDT2. Because vibration data VDT2 and VDT4 are lost, the microcomputer 600 cannot perform the learning of the vibration feedback device 100 normally.

In FIG. 18(C), while the microcomputer 600 is reading the vibration data VDT1, the demodulator 230 stores the subsequent vibration data VDT2 in the register unit 210. In this arrangement, the microcomputer 600 receives, for example, erroneous vibration data in which the vibration data VDT1 and VDT2 are mixed. When receiving the erroneous vibration data, the microcomputer 600 cannot perform the learning of the vibration feedback device 100.

Block Diagram of Vibration Feedback Device
According to Fourth Embodiment

Figure 19:
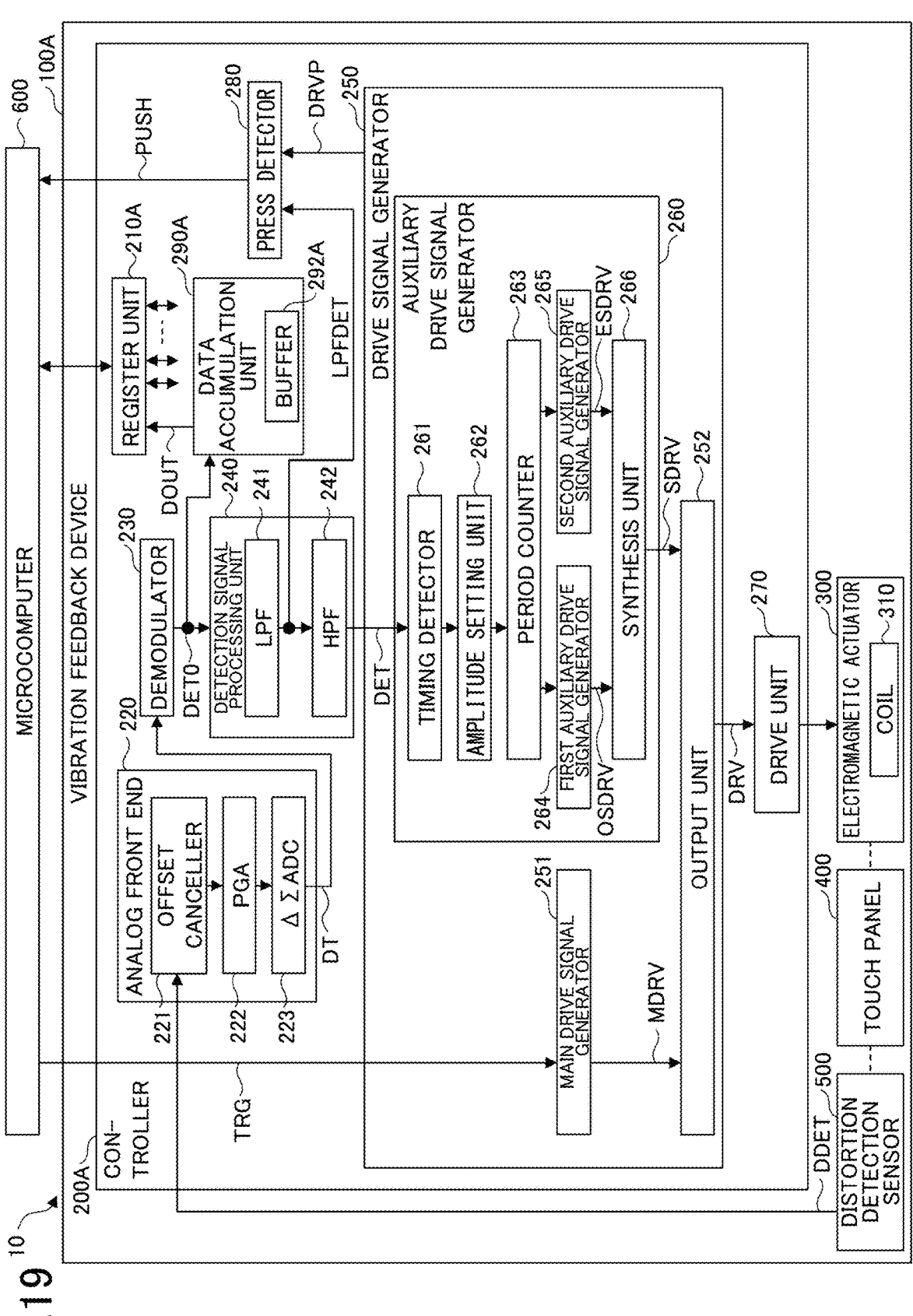
FIG. 19 is a block diagram showing an example of the vibration feedback device including the controller according to a fourth embodiment.

FIG. 19 is a block diagram showing an example of a vibration feedback device 100A having a controller 200A according to a fourth embodiment. Components that are similar to those in FIG. 17 are denoted by the same numerals, and detailed description of the components are omitted. The appearance and structure of the vibration feedback device 100A shown in FIG. 19 are the same as those of the vibration feedback device 100 shown in FIG. 1. The vibration feedback device 100A may operate by power that is supplied from a battery.

The vibration feedback device 100A shown in FIG. 19 has the same configuration as the vibration feedback device 100 shown in FIG. 17, except that the controller 200A is provided instead of the controller 200 shown in FIG. 17. For example, the controller 200A is manufactured as a semiconductor chip and is mounted on a substrate (not shown) that is mounted on the vibration feedback device 100A. The controller 200A operates in synchronization with a clock signal. Description of the clock signal is omitted.

The controller 200A has the same configuration as that of the controller 200 shown in FIG. 17, except that the controller 200A has a register unit 210A instead of the register unit 210 of the controller 200 shown in FIG. 17 and that the controller 200A further has a data storage unit 290A.

The data storage unit 290A has a FIFO (First-In First-Out) buffer 292A that sequentially stores a value (that is, vibration data VDT) of the detection signal DETO that is output from the demodulator 230. For example, each time the buffer 292A stores four vibration data VDT that are to be stored sequentially, the buffer 292A outputs the stored four held vibration data VDT in parallel to the register unit 210A as output data DOUT. The register unit 210A is allocated four registers with consecutive addresses that respectively store four vibration data VDT included in the output data DOUT. The number of vibration data VDT stored in the buffer 292A is not limited to four, and may be any multiple number (n, where n is an integer of 2 or greater).

(Transfer of Vibration Data from Controller to Microcomputer)

Figure 20:
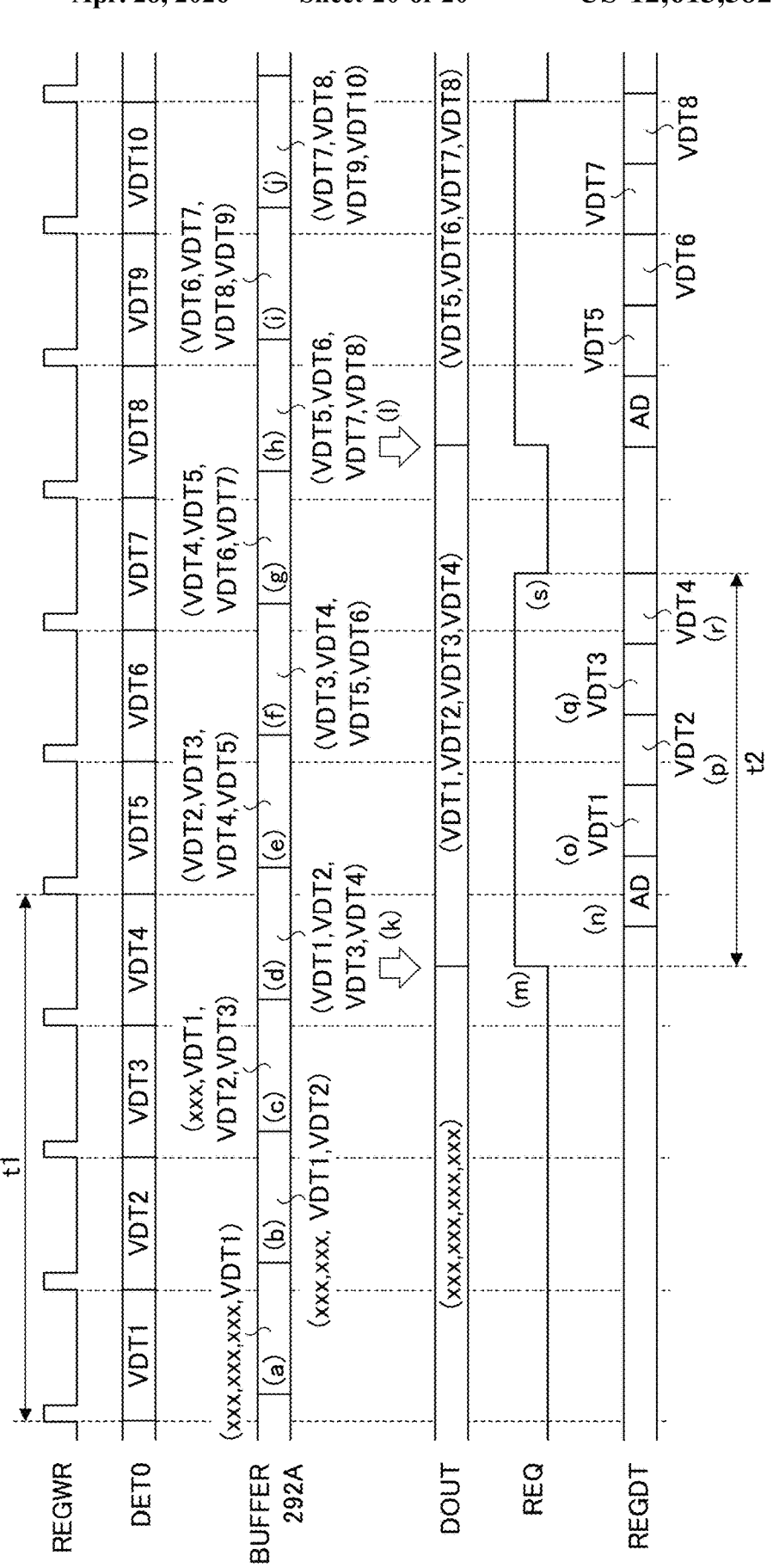
FIG. 20 is a timing diagram showing an example of transferring vibration data from the controller of FIG. 19 to the microcomputer.

FIG. 20 is a timing diagram showing an example of transferring the vibration data VDT from the controller 200A of FIG. 19 to the microcomputer 600. Detailed description of the same operation as in FIG. 18 is omitted. It is assumed that the microcomputer 600 used in the operation shown in FIG. 20 can transmit and receive data via the data line REGDT at the same timing as in FIG. 18(C). For example, the microcomputer 600 can transmit and receive approximately two data items for each output cycle of the write signal REGWR from the demodulator 230 to the register unit 210.

In FIG. 20, vibration data VDT (VDT1-VDT10) output from the demodulator 230 are sequentially stored in the buffer 292A of the data storage unit 290A (FIG. 20(a)-(j)). The buffer 292A holds the latest four vibration data VDT. Each time the latest four vibration data VDT are held in the buffer 292A, the data storage unit 290A transfers the four vibration data VDT held as output data DOUT to the register unit 210A (FIGS. 20(k) and (l)). In other words, the data storage unit 290A stores the four vibration data VDT held in the buffer 292A in the register unit 210A, each time the four vibration data VDT held in the buffer 292A are replaced.

The register unit 210A asserts the read request REQ to the microcomputer 600 in response to receiving the output data DOUT from the data storage unit 290A (FIG. 20(m)). In response to the assertion of the read request REQ, the microcomputer 600 outputs a register head address AD of the register unit 210 storing the vibration data VDT, to the register unit 210 via the data line REGDT (FIG. 20(n)).

The register unit 210 sequentially transfers the vibration data VDT held in the four registers from the head address AD, to the microcomputer 600 via the data line REGDT, and the microcomputer 600 sequentially acquires the transferred vibration data VDT (FIG. 20(o), (p), (q), and (r)). In the present embodiment, the register unit 210A negates the read request REQ in response to the completion of the transfer of the four vibration data VDT to the microcomputer 600 (FIG. 20(s)). In this arrangement, the output of the clear notification CLR from the microcomputer 600 to the register unit 210A shown in FIG. 18 is not required.

A time period t2 from when the register unit 210 outputs (asserts) the read request REQ until the four vibration data are read out to the microcomputer 600 is shorter than a time period t1 until the four vibration data VDT are stored in the buffer 292A from the demodulator 230. In this arrangement, even when the analysis speed of the vibration data VDT by the microcomputer 600 is low, all vibration data VDT output from the demodulator 230 can be transferred to the microcomputer 600.

As shown in FIG. 20, by transferring the four vibration data VDT to the microcomputer 600 in response to one read request signal REQ, the transfer time per vibration data VDT can be reduced compared to FIG. 3. The transfer time per vibration data VDT can be reduced in accordance with an increasing number of vibration data VDT held by the buffer 292A.

In addition, since it is not necessary to output the clear notification CLR from the microcomputer 600 to the register unit 210A, the transfer time per vibration data VDT can be further reduced. As a result, even when the processing performance of the microcomputer 600 is low, for example, all vibration data VDT output from the demodulator 230 can be transferred to the microcomputer 600.

As described above, in the present embodiment, all vibration data VDT output from the demodulator 230 can be transferred to the microcomputer 600 by collectively transferring a plurality of vibration data VDT to the microcomputer 600. As a result, the omission of vibration data VDT and the transfer of erroneous vibration data VDTs shown in FIG. 18 can be suppressed, and the microcomputer 600 can normally perform learning of the vibration feedback device 100.

In this arrangement, it is possible to suppress the vibrational behavior of the touch panel 400 across different vibration feedback devices 100 due to the variation in the natural frequencies of the touch panel 400 and the electromagnetic actuator 300. As a result, even when the natural frequencies of the touch panel 400 and the electromagnetic actuator 300 are varied, it is possible to suppress the transmission of uncomfortable vibrations to the user who presses the touch panel 400.

Furthermore, since it is not necessary to output the clear notification CLR from the microcomputer 600 when the reading of the vibration data VDT is completed, it is possible to suppress the loss of the vibration data VDT even when the analysis speed of the microcomputer 600 is low.

Although the present disclosure has been described based on the above-described embodiments, the present disclosure is not limited to the requirements shown in the above-described embodiments. These aspects can be modified to the extent that they do not impair the gist of the present disclosure, and can be appropriately determined in accordance with the applicable embodiments. For example, a sensor capable of detecting the displacement of the touch panel 400, such as an acceleration sensor, may be used instead of the distortion detection sensor 500.

The following items are described.

[1] A controller for controlling an actuator that applies vibration to an operation device based on operation of the operation device, includes:

a register unit accessible from an external device disposed externally;

a converter configured to periodically convert a detection signal output from a sensor that detects displacement of the operation device due to a press or vibration of the operation device, into a first digital signal; and a data storage unit that includes a buffer that sequentially stores the latest n vibration data (n is an integer of 2 or more), among the vibration data indicated by the first digital signal converted from the detection signal by the conversion unit, the data storage unit being configured to store n vibration data stored in the buffer in the register unit, each time the n vibration data held by the buffer are replaced, where the register unit is configured to output a read request to the external device each time the n vibration data are stored, and wait for subsequent n newest vibration data to be stored after the n vibration data are sequentially read using the external device.

[2] In a controller in [1], a time period from an output of a read request until n vibration data are read by an external device is shorter than a time period from a converter until the n vibration data are stored in a buffer.

[3] In a controller in [1] or [2], a register unit is configured to assert a read request to an external device each time n vibration data are stored, and negate the read request in response to the n vibration data being read by the external device.

[4] A vibration feedback device includes:

an operation device;

an actuator configured to apply vibration to the operation device based on operation of the operation device; and a controller configured to control the actuator, the controller including:

a register unit accessible from an external device disposed externally;

a converter configured to periodically convert a detection signal output from a sensor that detects displacement of the operation device due to a press or vibration of the operation device, into a first digital signal; and a data storage unit that includes a buffer that sequentially stores the latest n vibration data (n is an integer of 2 or more), among the vibration data indicated by the first digital signal converted from the detection signal by the conversion unit, the data storage unit being configured to store n vibration data stored in the buffer in the register unit, each time the n vibration data held by the buffer are replaced, where the register unit is configured to output a read request to the external device each time the n vibration data are stored, and waits for subsequent n newest vibration data to be stored after the n vibration data are sequentially read using the external device.

What is claimed is:

1. A controller for controlling an actuator that applies vibration to an operation device based on operation of the operation device, comprising:

a press detection circuit configured to receive a first detection signal from a sensor that detects displacement of the operation device caused by pressing, a press-and-hold operation, or vibration of the operation device, activate a first press detection signal based on the first detection signal upon detection of the pressing of the operation device, externally output the activated first press detection signal, and maintain the first press detection signal in an active state regardless of a level of the first detection signal while receiving, from a drive signal generation circuit, an active first drive period signal indicating a drive period of the actuator; and the drive signal generation circuit configured to generate a first drive signal to drive the actuator based on a drive startup signal that is externally received in response to the first press detection signal being externally output, generate a second drive signal to drive the actuator based on the first detection signal that is output from the sensor in response to the vibration of the operation device caused by the first drive signal, and output the first drive period signal to the press detection circuit during a period in which the actuator is driven by the first drive signal and the second drive signal.

2. The controller according to claim 1, wherein the press detection circuit is configured to detect the pressing of the operation device upon occurrence of a condition in which a period, during which the level of the first detection signal exceeds a level indicating a press operation of the operation device, is greater than or equal to a first time period.

3. The controller according to claim 1, wherein the press detection circuit is configured to output a second press detection signal during the press-and-hold operation of the operation device, based on the first detection signal, and suppress an output of the second press detection signal while receiving a second drive period signal, and wherein the drive signal generation circuit is configured to generate a third drive signal to drive the actuator based on a drive startup signal that is externally received in response to externally outputting the second press detection signal, generate a fourth drive signal to drive the actuator based on the first detection signal that is output from the sensor in response to the vibration of the operation device caused by the third drive signal, and output the second drive period signal during a period in which the actuator is driven by the third drive signal and the fourth drive signal.

4. The controller according to claim 3, wherein the press detection circuit is configured to detect the press-and-hold operation of the operation device upon occurrence of a condition in which a period, during which the level of the first detection signal falls below a level for the press-and-hold operation of the operation device, is greater than or equal to a time period.

5. The controller according to claim 1, further comprising:

an offset cancellation circuit configured to cancel an offset of the first detection signal;

an amplifier circuit configured to amplify the first detection signal whose offset has been canceled;

a delta sigma analog-to-digital conversion circuit configured to convert the amplified first detection signal into a serial data signal;

a demodulator configured to demodulate the serial data signal to generate a first digital signal; and a detection signal processing circuit configured to remove noise and an offset from the first digital signal to generate a second digital signal, wherein the press detection circuit is configured to receive the second digital signal as the first detection signal, and wherein the drive signal generation circuit is configured to receive the second digital signal as the first detection signal, and generate the second drive signal to drive the actuator.

6. A vibration feedback device comprising:

an operation device;

an actuator configured to apply vibration to the operation device based on operation of the operation device; and a controller configured to control the actuator and including:

a press detection circuit configured to receive a first detection signal from a sensor that detects displacement of the operation device caused by pressing, a press-and-hold operation, or vibration of the operation device, activate a first press detection signal based on the
first detection signal upon detection of the press-
ing of the operation device, externally output the activated first press detection
signal, and maintain the first press detection signal in an active
state regarding of a level of the first detection
signal while receiving, from a drive signal gen-
eration circuit, an active first drive period signal
indicating a drive period of the actuator; and the drive signal generation circuit configured to generate a first drive signal to drive the actuator
based on a drive startup signal that is externally
received in response to the first press detection
signal being externally output, generate a second drive signal to drive the actuator
based on the first detection signal that is output
from the sensor in response to the vibration of the
operation device caused by the first drive signal,
and output the first drive period signal to the press
detection circuit during a period in which the
actuator is driven by the first drive signal and the
second drive signal.

* * * * *